United States Patent
Chang et al.

(10) Patent No.: US 12,309,476 B2
(45) Date of Patent: *May 20, 2025

(54) OPTICAL LENS ASSEMBLY AND ELECTRONIC DEVICE

(71) Applicant: LARGAN PRECISION CO., LTD., Taichung (TW)

(72) Inventors: Ming-Shun Chang, Taichung (TW); Ming-Ta Chou, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 94 days.

This patent is subject to a terminal disclaimer.

(21) Appl. No.: 18/308,756

(22) Filed: Apr. 28, 2023

(65) Prior Publication Data

US 2023/0262309 A1    Aug. 17, 2023

Related U.S. Application Data

(63) Continuation of application No. 17/563,241, filed on Dec. 28, 2021, now Pat. No. 11,671,689, which is a (Continued)

(30) Foreign Application Priority Data

Dec. 14, 2018   (TW) .................................. 107145332

(51) Int. Cl.
   *H04N 23/55*   (2023.01)
   *G02B 3/00*   (2006.01)
   (Continued)

(52) U.S. Cl.
   CPC ............ *H04N 23/55* (2023.01); *G02B 3/0031* (2013.01); *G02B 5/003* (2013.01); *G02B 7/20* (2013.01); *G02B 13/001* (2013.01); *G03B 17/12* (2013.01)

(58) Field of Classification Search
   CPC .. H04N 5/2254; H04N 5/2251; H04N 5/2253; H04N 5/2257; G02B 3/0031;
   (Continued)

(56) References Cited

U.S. PATENT DOCUMENTS 6,055,111 A * 4/2000 Nomura ........... B29D 11/00413
                                                    359/811
6,819,508 B2   11/2004 Chiang
   (Continued)

FOREIGN PATENT DOCUMENTS

CN   101003170 A   7/2007
CN   107219580 A   9/2017
   (Continued)

*Primary Examiner* — Sinh Tran
*Assistant Examiner* — Zhenzhen Wu
(74) *Attorney, Agent, or Firm* — McClure, Qualey & Rodack, LLP

(57) ABSTRACT

An optical lens assembly includes at least one dual molded lens element. The dual molded lens element has a central axis, and includes a light transmitting portion and a light absorbing portion. The light transmitting portion includes an optical effective region and a lens peripheral region, and the lens peripheral region surrounds the optical effective region. A light absorbing portion surrounds the optical effective region. The light transmitting portion and the light absorbing portion are made of different plastic materials with different colors, and the light absorbing portion includes at least three gate portions surrounding the central axis, wherein all gate portions are located on the same surface of the dual molded lens element. The light transmitting portion and the light absorbing portion of the dual molded lens element are integrally formed by the injection molding.

21 Claims, 32 Drawing Sheets

Related U.S. Application Data continuation of application No. 16/574,248, filed on Sep. 18, 2019, now Pat. No. 11,245,824.

(51) Int. Cl.
*G02B 5/00* (2006.01)
*G02B 7/20* (2021.01)
*G02B 13/00* (2006.01)
*G03B 17/12* (2021.01)

(58) Field of Classification Search
CPC ........ G02B 5/003; G02B 7/20; G02B 13/001; G02B 13/0045; G02B 5/005; G02B 7/021; G02B 7/022; G03B 17/12; H04M 1/0264
See application file for complete search history.

(56) References Cited

U.S. PATENT DOCUMENTS

| | | | |
|---|---|---|---|
| 7,391,457 B2 | 6/2008 | Fujimoto et al. | |
| 7,545,583 B2 | 6/2009 | Hayashi et al. | |
| 8,031,412 B2 | 10/2011 | Shintani | |
| 8,102,609 B2 | 1/2012 | Tsuchiya et al. | |
| 8,455,810 B2 | 6/2013 | Tomioka et al. | |
| 8,599,501 B2 | 12/2013 | Chang | |
| 8,736,989 B2 | 5/2014 | Wu | |
| 8,817,396 B2 | 8/2014 | Mori et al. | |
| 8,947,795 B2 | 2/2015 | Kobayashi et al. | |
| 8,964,313 B2 | 2/2015 | Kobayashi et al. | |
| 8,964,314 B2 | 2/2015 | Koike et al. | |
| 9,726,846 B2 | 8/2017 | Bone | |
| 10,126,529 B2 | 11/2018 | Chou | |
| 10,288,852 B2 | 5/2019 | Huang et al. | |
| 2001/0007513 A1* | 7/2001 | Koshimizu | B29D 11/00009 359/811 |
| 2008/0117292 A1* | 5/2008 | Orihara | G02B 7/022 348/E5.026 |
| 2012/0224267 A1 | 9/2012 | Kikuchi et al. | |
| 2013/0242406 A1 | 9/2013 | Kobayashi et al. | |
| 2014/0233115 A1* | 8/2014 | Akutsu | B29C 45/14065 264/1.7 |
| 2014/0334019 A1 | 11/2014 | Ishiguri et al. | |
| 2014/0347752 A1 | 11/2014 | Koike et al. | |
| 2015/0253569 A1* | 9/2015 | Lin | G02B 5/003 359/503 |
| 2015/0323757 A1 | 11/2015 | Bone | |
| 2016/0091631 A1 | 3/2016 | Choi | |
| 2016/0313472 A1 | 10/2016 | Huang et al. | |
| 2016/0370556 A1 | 12/2016 | Ito | |
| 2016/0377828 A1 | 12/2016 | Ito | |
| 2017/0245370 A1 | 8/2017 | Wang et al. | |
| 2017/0322394 A1 | 11/2017 | Chou et al. | |
| 2017/0322395 A1 | 11/2017 | Lin et al. | |
| 2018/0164545 A1 | 6/2018 | Chou | |
| 2020/0285029 A1 | 9/2020 | Watanabe | |

FOREIGN PATENT DOCUMENTS

| | | |
|---|---|---|
| JP | 2014237260 A | 12/2014 |
| TW | I581030 B | 5/2017 |
| TW | 201723555 A | 7/2017 |
| TW | 201723556 A | 7/2017 |
| TW | I612354 B | 1/2018 |
| TW | 201812344 A | 4/2018 |
| TW | 201821830 A | 6/2018 |
| TW | I633331 B | 8/2018 |
| TW | I639027 B | 10/2018 |
| TW | I658299 B | 5/2019 |

* cited by examiner

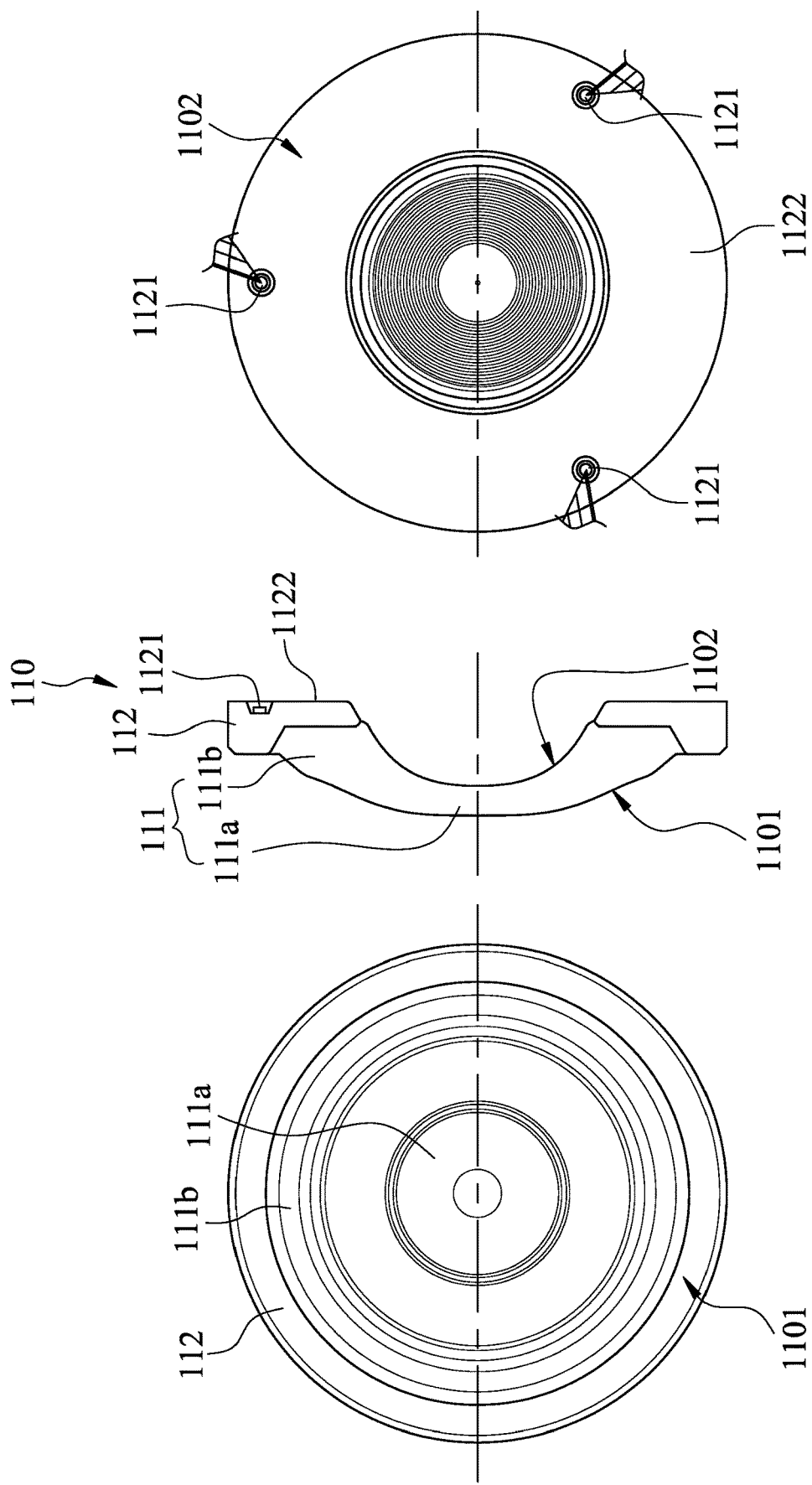

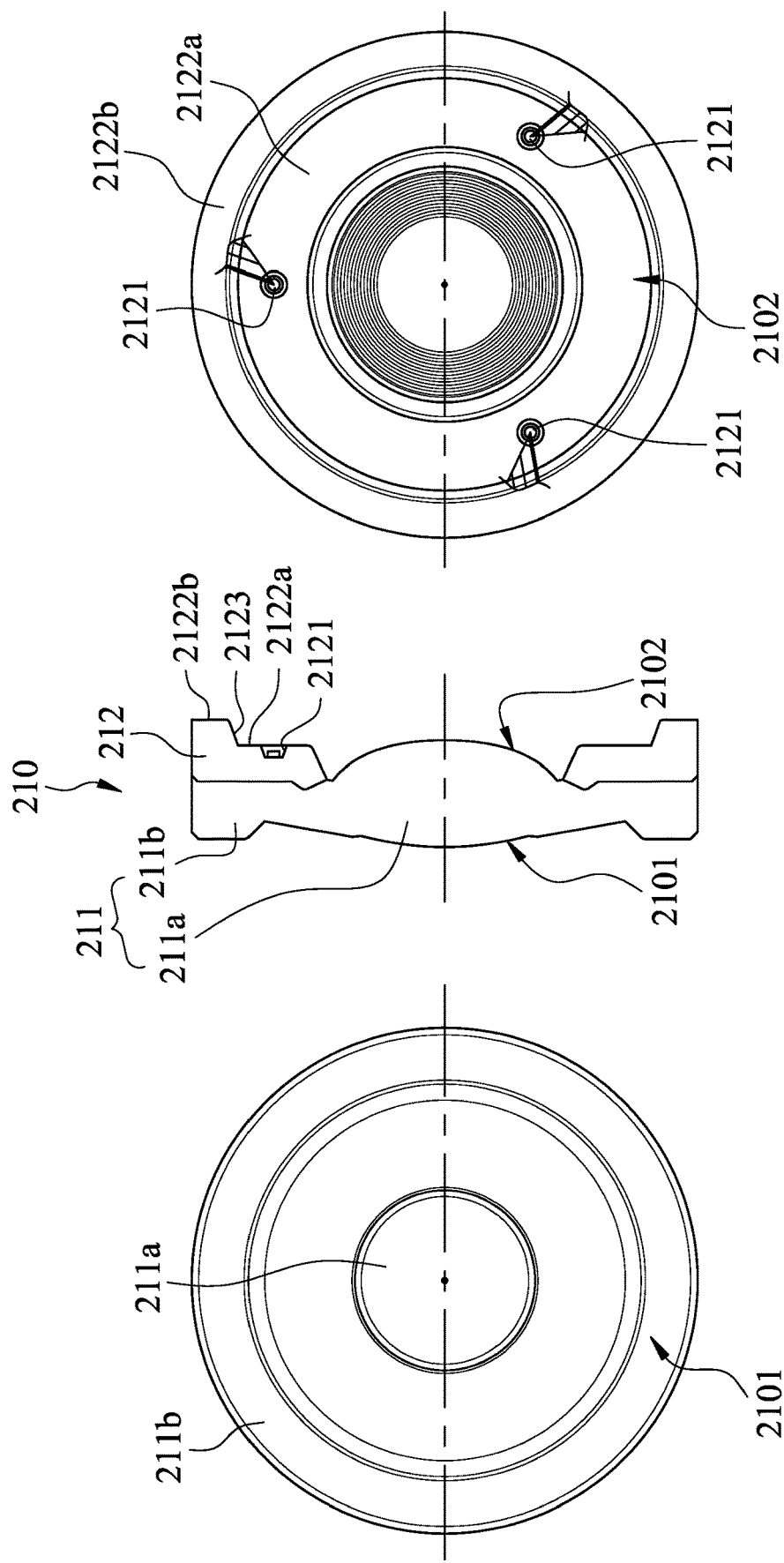

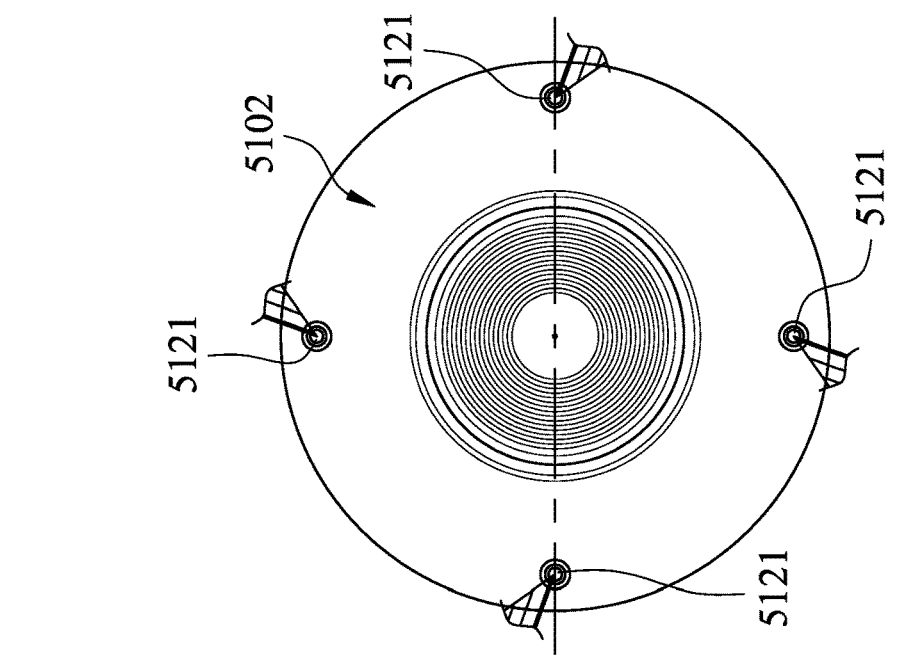
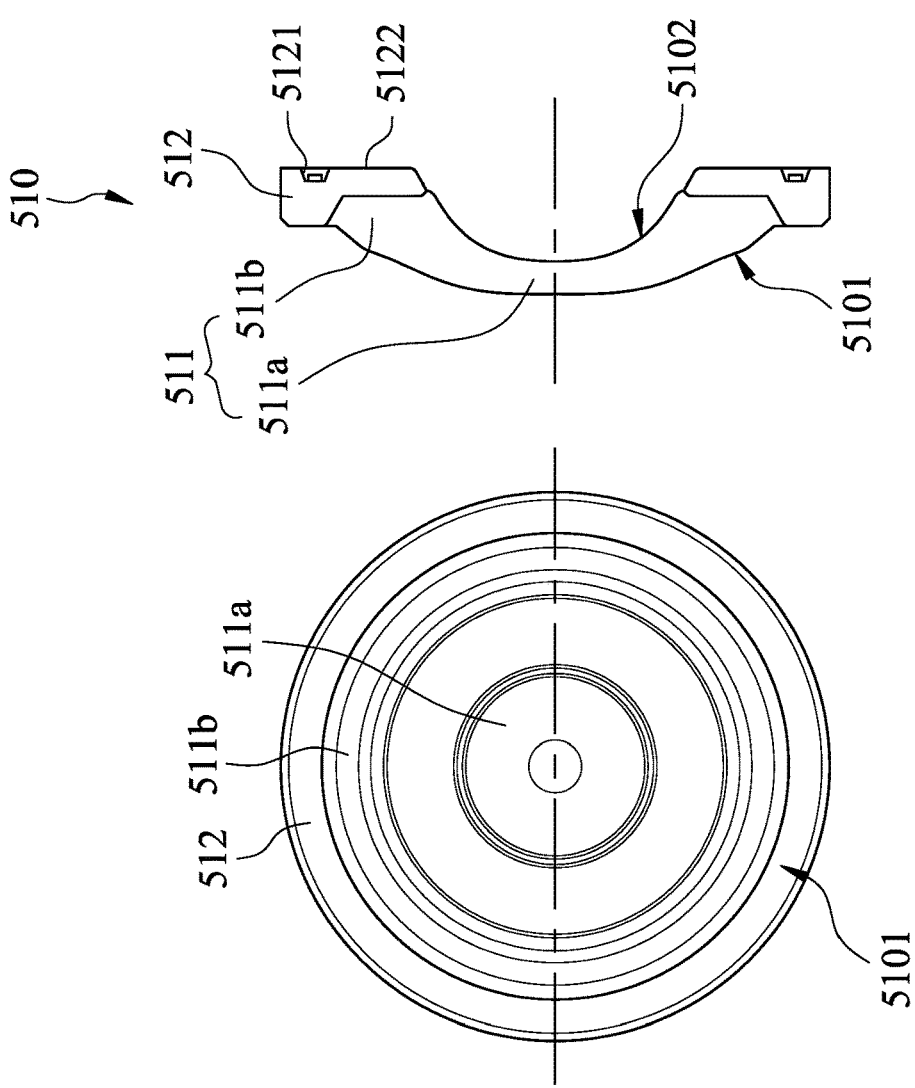
Fig. 5D
Fig. 5C
Fig. 5B

OPTICAL LENS ASSEMBLY AND ELECTRONIC DEVICE

RELATED APPLICATIONS

The present application is a continuation of the application Ser. No. 17/563,241, filed on Dec. 28, 2021, U.S. Pat. No. 11,671,689 issued on Jun. 6, 2023, which is a continuation of the application Ser. No. 16/574,248, filed Sep. 18, 2019, U.S. Pat. No. 11,245,824 issued on Feb. 8, 2022, and claims priority to Taiwan application serial number 107145332, filed Dec. 14, 2018, the entire contents of which are hereby incorporated herein by references.

BACKGROUND

Technical Field

The present disclosure relates to an optical lens assembly. More particularly, the present disclosure relates to an optical lens assembly applicable to portable electronic devices.

Description of Related Art

In recent years, portable electronic devices have developed rapidly. For example, intelligent electronic devices and tablets have been filled in the lives of modern people, and camera module mounted on portable electronic devices has also prospered. However, as technology advances, the quality requirements of camera modules are becoming higher and higher. Therefore, in addition to the improvement in optical design, the camera module needs to be improved in manufacturing precision.

SUMMARY

According to an embodiment of the present disclosure, an optical lens assembly includes at least one dual molded lens element. The dual molded lens element has a central axis and includes a light transmitting portion and a light absorbing portion. The light transmitting portion includes an optical effective region and a lens peripheral region, wherein the lens peripheral region surrounds the optical effective region. The light absorbing portion surrounds the optical effective region. The light transmitting portion and the light absorbing portion are made of different plastic materials with different colors, and the light absorbing portion includes at least three gate portions surrounding the central axis, wherein the gate portions are all located on a same surface of an object-side surface and an image-side surface of the dual molded lens element. The light transmitting portion and the light absorbing portion of the dual molded lens element are integrally formed by an injection molding.

According to an embodiment of the present disclosure, an electronic device includes a camera module which includes the optical lens assembly of the aforementioned embodiment and an image sensor, and the image sensor is disposed on an image surface of the optical lens assembly.

According to an embodiment of the present disclosure, an electronic device includes at least two camera modules which face toward a same side, wherein at least one of the at least two camera modules includes the optical lens assembly of the aforementioned embodiment and an image sensor, and the image sensor is disposed on an image surface of the optical lens assembly.

BRIEF DESCRIPTION OF THE DRAWINGS

The present disclosure can be more fully understood by reading the following detailed description of the embodiment, with reference made to the accompanying drawings as follows:

FIG. 1B is a schematic view of the object-side surface of the dual molded lens element according to the 1st example of FIG. 1A.

FIG. 1C is a schematic view of the dual molded lens element according to the 1st example of FIG. 1A.

FIG. 1D is a schematic view of the image-side surface of the dual molded lens element according to the 1st example of FIG. 1A.

FIG. 2B is a schematic view of the object-side surface of the dual molded lens element according to the 2nd example of FIG. 2A.

FIG. 2C is a schematic view of the dual molded lens element according to the 2nd example of FIG. 2A.

FIG. 2D is a schematic view of the image-side surface of the dual molded lens element according to the 2nd example of FIG. 2A.

FIG. 5B is a schematic view of the object-side surface of the dual molded lens element according to the 5th example of FIG. 5A.

FIG. 5C is a schematic view of the dual molded lens element according to the 5th example of FIG. 5A.

FIG. 5D is a schematic view of the image-side surface of the dual molded lens element according to the 5th example of FIG. 5A.

DETAILED DESCRIPTION

Figure 1A:
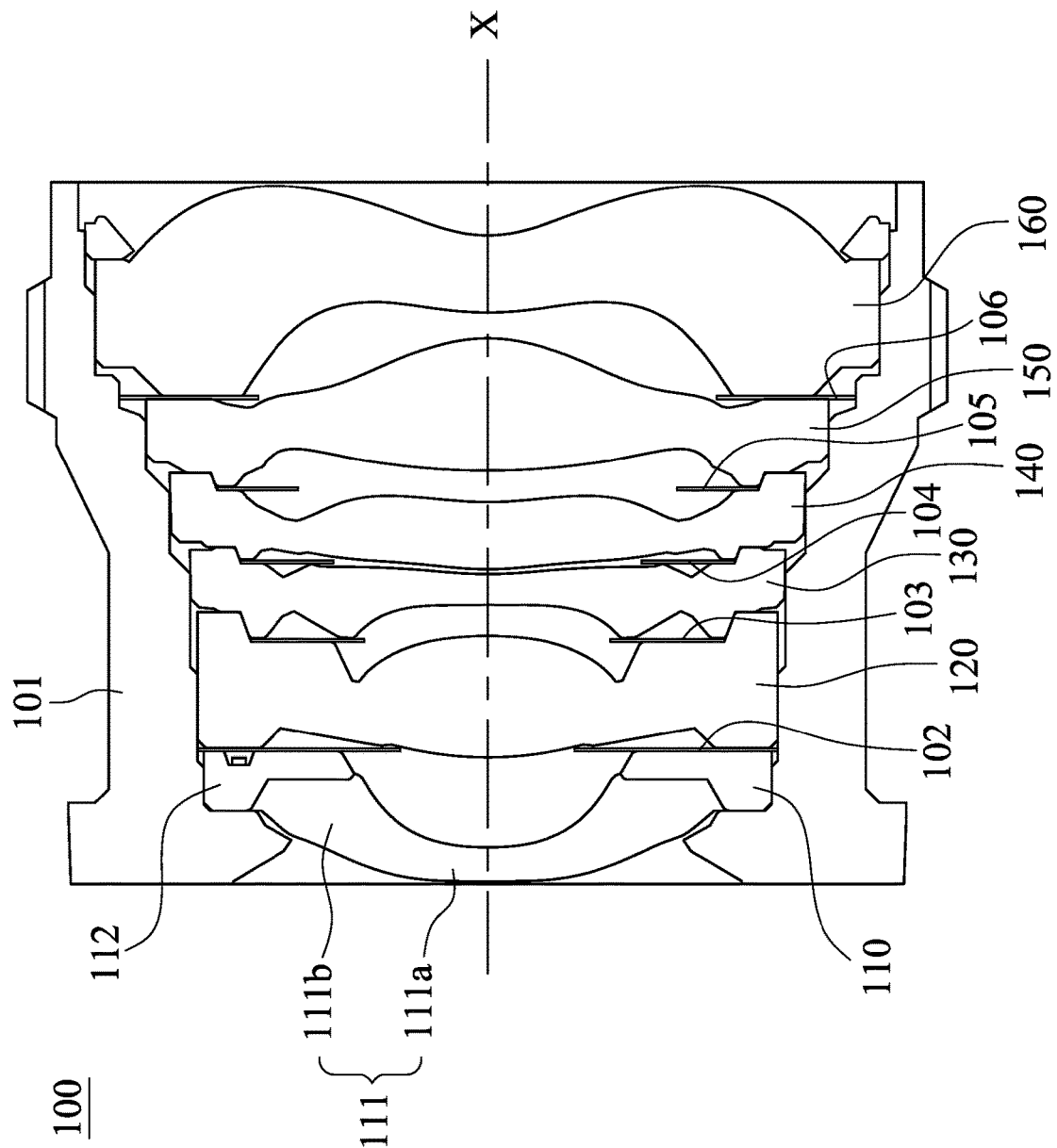
FIG. 1A is a schematic view of an optical lens assembly according to the 1st example of the present disclosure.

According to the present disclosure, an optical lens assembly includes at least one dual molded lens element. The dual molded lens element has a central axis and includes a light transmitting portion and a light absorbing portion. The light transmitting portion includes an optical effective region and a lens peripheral region, wherein the lens peripheral region surrounds the optical effective region. The light absorbing portion surrounds the optical effective region. The light transmitting portion and the light absorbing portion are made of different plastic materials with different colors, and the light absorbing portion includes at least three gate portions surrounding the central axis, wherein the at least three gate portions are all located on a same surface of an object-side surface and an image-side surface of the dual molded lens element. The light transmitting portion and the light absorbing portion of the dual molded lens element are integrally formed by an injection molding. By using the at least three gate portions to form the light absorbing portion of the dual molded lens element and disposing all the gate portions on the same surface, it is favorable for simplifying the mold design, and the complexity of the injection flow path is effectively reduced.

It should be mentioned that the optical effective region of the present disclosure refers to a region passed through by the imaging light, which may be a plane or a surface having a diopter or aspheric surface; if it is blocked, the imaging result may be affected. Dual molding means that it is made by dual-shot injection molding or dual molding, and the dual molded lens element of the present disclosure is not limited to any of the foregoing. The light absorbing portion is a region where visible light cannot pass, and may be a black material.

The light transmitting portion and the light absorbing portion of the dual molded lens element can be formed by the dual-shot injection molding. The dual molded lens element can be formed by using the precision of the mold itself to maintain the size of the light transmitting portion and the light absorbing portion within a reasonable range, so as to effectively control the quality of the dual molded lens element, and avoid the situation that the manufacturing process of the light absorbing portion needs to wait for the light transmitting portion to be completed, so that the number of steps in the manufacturing process can be reduced and the risk of dust contamination of the dual molded lens element can be effectively reduced.

When a farthest vertical distance between the at least three gate portions and the central axis is Rg, and an outer diameter of the light absorbing portion is Da, the following condition is satisfied: $0.20 < 2Rg/Da \leq 0.97$. Therefore, the position of the gate portions can be avoided from appearing at the edge of the light absorbing portion. Due to the light absorbing portion is an opening-hole shape structure, it is favorable for improving the molding quality of the surface, and the situation of uneven filling is less to occur, but also to avoid the flow direction of perfusion plastic and the structure of mold from producing excessive and unnecessary containment effects. Furthermore, the following condition can be satisfied: $0.50 < 2Rg/Da \leq 0.95$. Therefore, it can further avoid the continuous operation stage of mass production and the situation that the mold surface is corroded when the molten plastic flowing inside the mold cavity.

Each of the gate portions can include a recess structure. Therefore, it is favorable for avoiding the effect of the assembling flatness of the light absorbing portion and the optical element adjacent thereto from the position of the gate portion, so that the demand for miniaturization of the dual molded lens element can be smoothly achieved, and the extra occupied volume for the gate portions and unnecessary materials increase can be avoided.

The dual molded lens element can further include at least one image-side connecting surface, which is located on the image-side surface of the dual molded lens element for connecting to the optical element adjacent to the dual molded lens element in the optical lens assembly, wherein the image-side connecting surface surrounds the optical effective region, and all of the recess structure are disposed on the image-side connecting surface. Therefore, when the image-side connecting surface is used as the support structure, there still have the ample appropriate space for setting the ideal injection position, so that the overall dual molded lens element does not need to give up the preferred injection position for accommodating the support structure. There is a positive assistance for the molding quality of the dual molded lens element.

All of the gate portions are located on a same plane. Therefore, the number of molding elements can be effectively reduced so as to reduce the manufacturing cost. Moreover, the plane can be perpendicular to the central axis. Therefore, the process of the mold processing can be reduced, and the attrition rate of the processing tool can be decreased, so as to reduce the cost of production development.

When a minimum opening diameter of the light absorbing portion surrounding the optical effective region is Damin, and an outer diameter of the dual molded lens element is DL, the following condition is satisfied: $0.20 < Damin/DL < 0.80$.

By maintaining the opening size of the light absorbing portion and the outer diameter of the dual molded lens element at a specific ratio, the dual molded lens element has a flaky arrangement and a uniform thickness, so as to avoid appearing a situation that the thickness variation of the partial region is excessively large. When the value of Damin/DL is too large, the dual molded lens element is excessively flaky, and the light absorbing portion is more susceptible to the additional and unnecessary influence of the molten light transmitting portion during the injection molding stage; when the value of Damin/DL is too small, it means that the width of the light absorbing portion is too thin, and it is easy to warp and deform under the geometric requirement of the ring-shaped appearance. Furthermore, the following condition can be satisfied: 0.30<Damin/DL<0.70. By the preferred flaky ratio, the thickness and the uniformity of the light absorbing portion can acquire better control.

When a maximum thickness of the light absorbing portion is ETamax, and a thickness of the dual molded lens element close to the central axis is CT, the following condition is satisfied: 0.3<ETamax/CT<2.5. When the value of ETamax/CT is too large and the dual molded lens element is squeezed by the assembly force, the optical effective region is easily deformed, which has a negative impact on the image quality; when the value of ETamax/CT is too small, the light absorbing part is inefficient in shielding stray light. Furthermore, the following condition can be satisfied: 1.0<ETamax/CT<2.5. Therefore, the optical effective region can be further balanced between the non-deformation and the shielding stray light efficiency.

The region where the light absorbing portion is projected onto the central axis does not overlap with the region of the dual molded lens element on the central axis. Therefore, it is applicable to more dual molded lens elements of different specifications, so that when a specific dual molded lens element has a special shape with correcting a specific optical aberration, the light absorbing portion can be provided, and the stray light cannot be reduced because of the optical aberration that must be corrected due to the lens appearance.

When a gap between a region projected by the light absorbing portion onto the central axis and a central thickness region of the dual molded lens element is dT, and a thickness of the dual molded lens element close to the central axis is CT, the following condition is satisfied: 0.2<dT/CT<3.0. Therefore, the light absorbing portion and the optical effective region can be maintained at a specific distance, so that the plastic cooling situation of the optical effective region is more simple, which can be regarded as a plastic cooling situation of a general monochrome molded lens element, and it is favorable for adjusting the parameters of the injection machine and making a dual molded lens element that can shield unnecessary light. Furthermore, the following condition can be satisfied: 0.5<dT/CT<2.2. Since the value of dT/CT is too large, the appearance of the dual molded lens element is not easily controlled; and the value of dT/CT is too small, the cooling situation of the optical effective region must be added to consider the existence of the heat source of the light absorption portion. Therefore, the value of dT/CT is placed in the above range, and it is favorable for the manufacture of the dual molded lens element.

When an area of the dual molded lens element is AL, and an area of the light absorbing portion is Aa, the following condition is satisfied: 0.50<Aa/AL<0.94. Therefore, an appropriate light shielding effect is provided, and the shielding area can be prevented from being too large, which cause that the light inlet quantity of the optical lens assembly is limited, or the shielding area can be prevented from being too small, which cause that the shielding efficiency is poor when it faces the strong source in the real shot situation. Furthermore, the following condition can be satisfied: 0.70<Aa/AL<0.94. Therefore, the partial resolution of the imaging can be further improved, and the excessively bright stray light is prevented from being projected in the partial imaging region, so that the region is completely invisible.

The optical lens assembly can further include a plurality of optical elements, and the dual molded lens element further includes an image-side axial connecting structure, which includes an axial connecting surface and at least one image-side connecting surface, wherein the at least one image-side connecting surface is away from the optical effective region than the axial connecting surface is therefrom. The image-side axial connecting structure is for aligning the dual molded lens element with the optical elements adjacent thereto. Therefore, the assembly tolerance of the optical lens assembly can be ideally improved, and the resolution of the optical lens assembly can be improved.

When an angle between the axial connecting surface and the at least one image-side connecting surface is α, the following condition is satisfied: 95 degrees<α<135 degrees. Therefore, under the premise of considering the release demand, the manufacturing conditions suitable for injection molding can be configured to cope with the high pressure situation of a large number of continuous injection productions.

The image-side axial connecting structure can be disposed at least on the light absorbing portion. Therefore, the quality of the optical effective region of the light transmitting portion can be improved, and the dimensional accuracy of the aligning structure is improved in the molding stage of the light absorbing portion, so that the efficiency of the mold design is increased.

The image-side axial connecting structure is aligned with at least two of the optical elements adjacent thereto. Therefore, the image-side axial connecting structure is aligned simultaneously with the two optical elements by an axial connecting structure, and the miniaturized structural requirements can be effectively achieved.

Each of the aforementioned features of the optical lens assembly can be utilized in various combinations for achieving the corresponding effects.

According to the present disclosure, an electronic device includes a camera module. The camera module includes the aforementioned optical lens assembly and an image sensor, and the image sensor is disposed on an image surface of the optical lens assembly. Therefore, an electronic device with miniaturization and better image quality is provided.

According to the present disclosure, an electronic device includes at least two camera modules which face toward a same side. At least one of the at least two camera modules includes the aforementioned optical lens assembly and an image sensor, and the image sensor is disposed on an image surface of the optical lens assembly. Therefore, under the premise of achieving the goal of miniaturization, the image quality and the application range of the electronic device are further improved.

1st Example

FIG. 1A is a schematic view of an optical lens assembly 100 according to the 1st example of the present disclosure. In FIG. 1A, the optical lens assembly 100 includes a lens barrel 101, a dual molded lens element 110 and a plurality of optical elements 102, 120, 103, 130, 104, 140, 105, 150, 106, 160, wherein the dual molded lens element 110 and the optical elements 102, 120, 103, 130, 104, 140, 105, 150, 106, 160 are disposed in the lens barrel 101, and the dual molded lens element 110 can be aligned with the optical element 102. In the 1st example, the optical element 102 is a light shielding sheet.

FIG. 1B is a schematic view of the object-side surface 1101 of the dual molded lens element 110 according to the 1st example of FIG. 1A, FIG. 1C is a schematic view of the dual molded lens element 110 according to the 1st example of FIG. 1A, and FIG. 1D is a schematic view of the image-side surface 1102 of the dual molded lens element 110 according to the 1st example of FIG. 1A. In FIGS. 1A, 1B, 1C and 1D, the dual molded lens element 110 has a central axis and includes a light transmitting portion 111 and a light absorbing portion 112. The light transmitting portion 111 includes an optical effective region 111a and a lens peripheral region 111b, wherein the lens peripheral region 111b surrounds the optical effective region 111a. The light absorbing portion 112 surrounds the optical effective region 111a, and the light transmitting portion 111 and the light absorbing portion 112 are made of different plastic materials with different colors. The light transmitting portion 111 and the light absorbing portion 112 of the dual molded lens element 110 are integrally formed by an injection molding. In the 1st example, the light transmitting portion 111 and the light absorbing portion 112 of the dual molded lens element 110 are formed by a dual-shot injection molding.

Figure 1E:
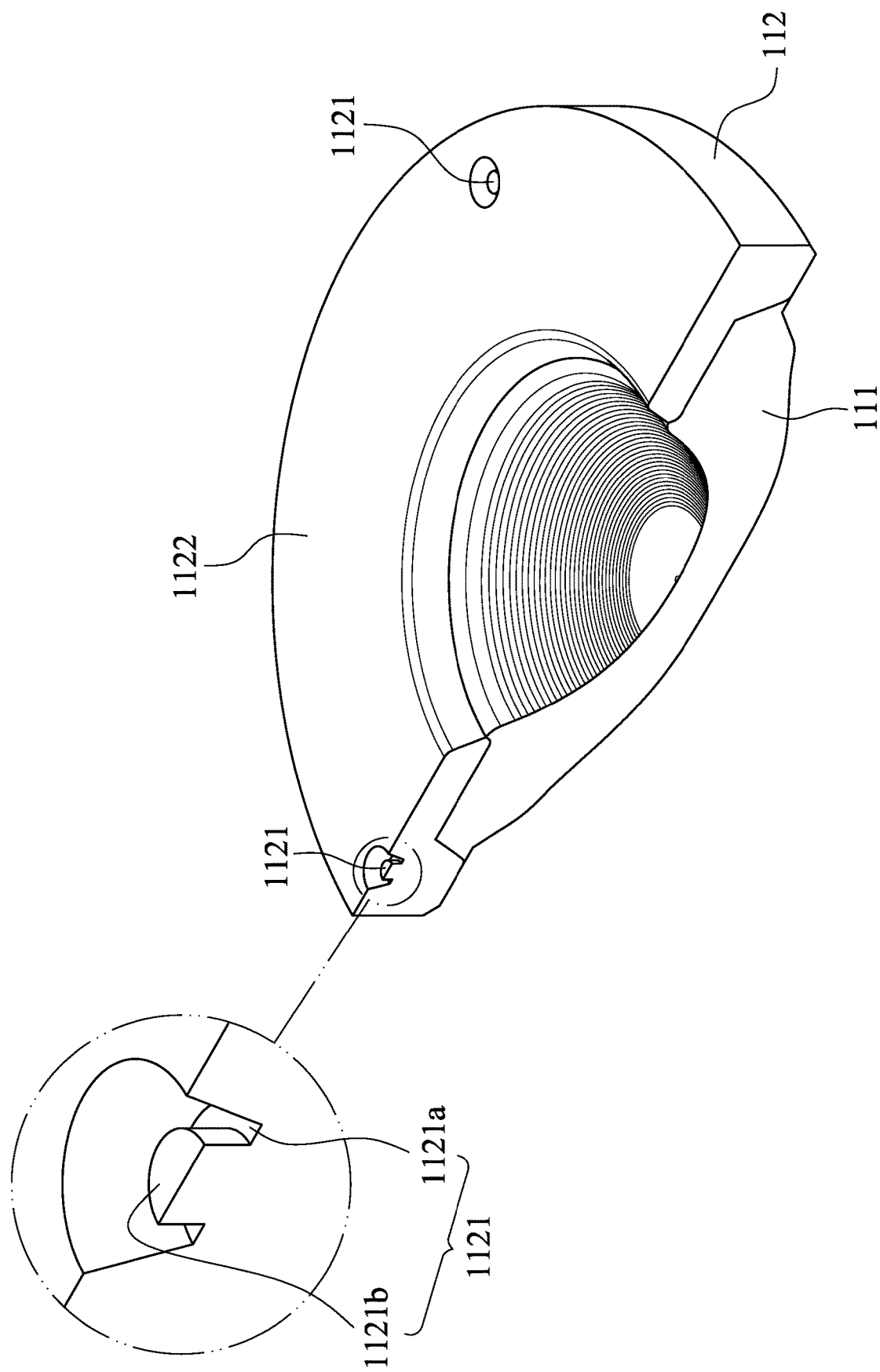
FIG. 1E is a schematic view of the gate portion according to the 1st example of FIG. 1A.
Figure 1F:
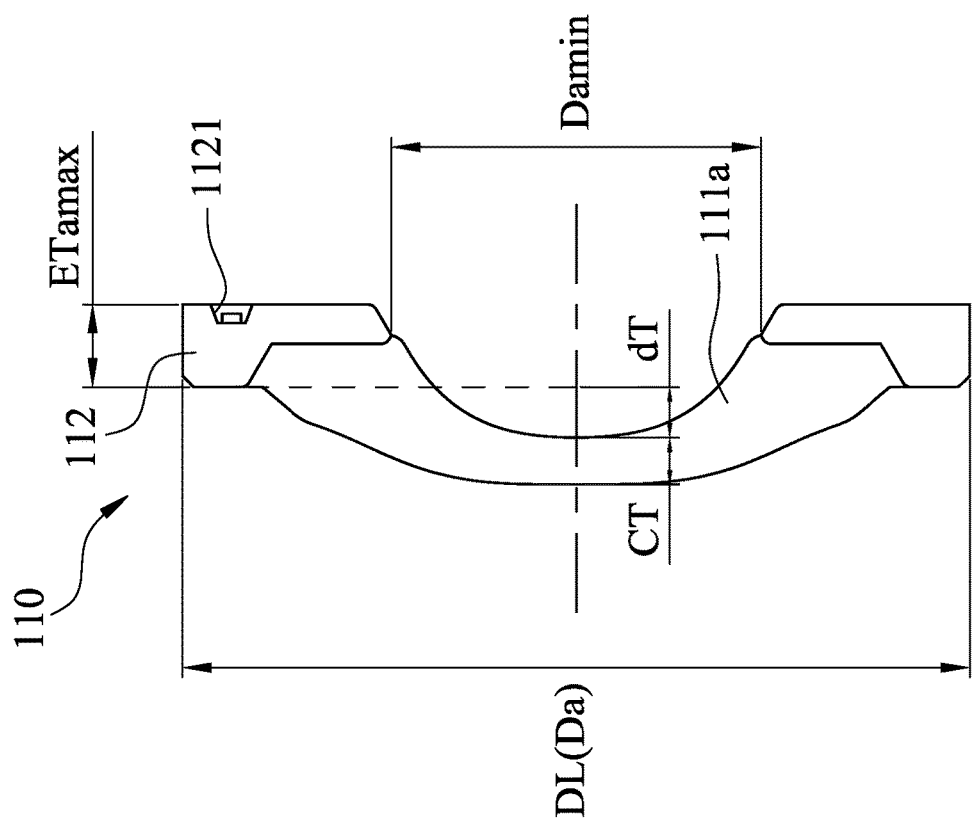
FIG. 1F is a schematic view of the parameters according to the 1st example of FIG. 1A.

In FIGS. 1A and 1C, the region where the light absorbing portion 112 is projected onto the central axis X does not overlap with the region of the dual molded lens element 110 on the central axis X (as shown in FIG. 1F).

In FIG. 1D, the light absorbing portion 112 includes at least three gate portions 1121 surrounding the central axis X, wherein the gate portions 1121 are all located on a same surface of an object-side surface 1101 and an image-side surface 1102 of the dual molded lens element 110. In particular, according to the 1st example, the number of the gate portions 1121 is three, and are all disposed on the image-side surface 1102 of the dual molded lens element 110.

FIG. 1E is a schematic view of the gate portions 1121 according to the 1st example of FIG. 1A. In FIG. 1E, each of the gate portions 1121 can include a recess structure 1121a, and the gate portion mark 1121b is located on the recess structure 1121a. The dual molded lens element 110 can further include at least one image-side connecting surface 1122 located on the image-side surface 1102 of the dual molded lens element 110 for connecting to an optical element 102 adjacent to the dual molded lens element 110 in the optical lens assembly 100, wherein the image-side connecting surface 1122 surrounds the optical effective region 111a, and all of the recess structure 1121a are disposed on the image-side connecting surface 1122. In the 1st example, the number of the image-side connecting surface 1122 is one, and it is perpendicular to the central axis X, and all of the gate portions 1121 are located on the image-side connecting surface 1122. That is, all of the gate portions 1121 are located on a same plane.

Figure 1G:
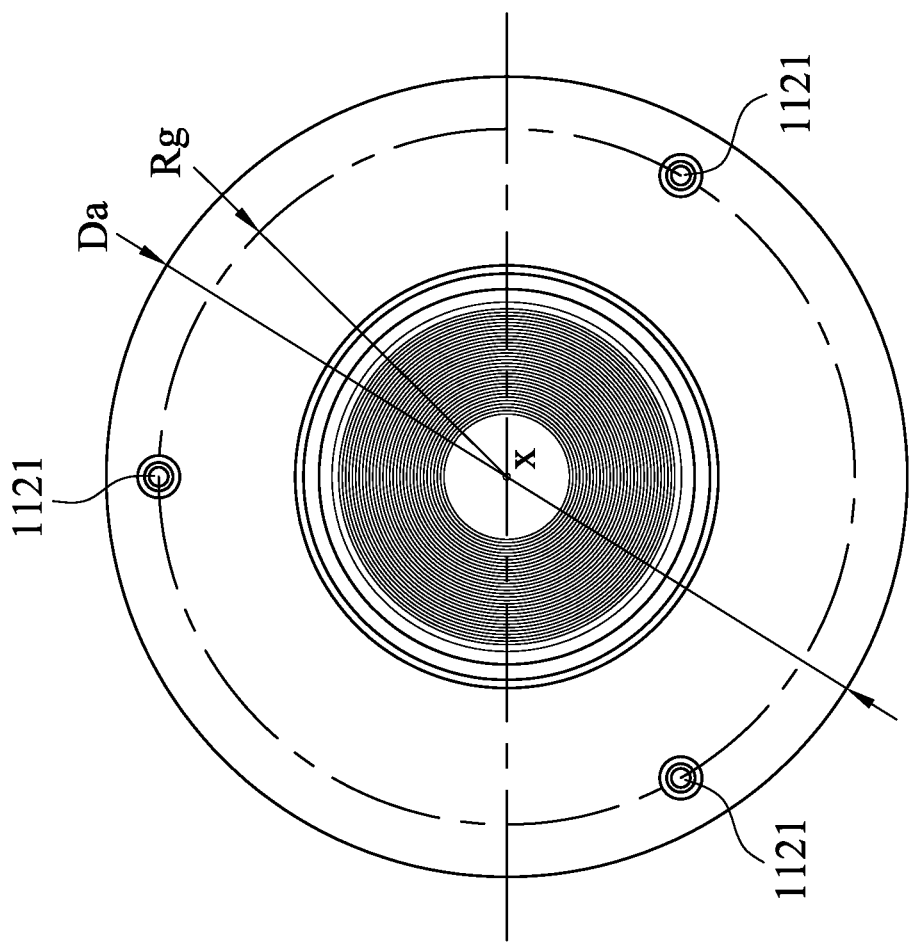
FIG. 1G is another schematic view of the parameters according to the 1st example of FIG. 1A.

FIGS. 1F and 1G which are schematic views of the parameters according to the 1st example of FIG. 1A, respectively. In FIGS. 1F and 1G, when a farthest vertical distance between the gate portion 1121 and the central axis X is Rg (in the 1st example, the farthest vertical distances between three of the gate portions 1121 and the central axis X are all the same), an outer diameter of the light absorbing portion 112 is Da, a minimum opening diameter of the light absorbing portion 112 surrounding the optical effective region 111a is Damin, an outer diameter of the dual molded lens element 110 is DL (in the 1st example, DL=Da), a maximum thickness of the light absorbing portion 112 is ETamax, a thickness of the dual molded lens element 110 close to the central axis X is CT, and a gap between a region projected by the light absorbing portion 112 onto the central axis X and a central thickness region of the dual molded lens element 110 is dT, the following conditions of Table 1 are satisfied, respectively.

TABLE 1

| the 1st example | | | |
|---|---|---|---|
| Rg | 1.825 mm | ETamax | 0.44 mm |
| Da | 4.2 mm | CT | 0.25 mm |
| 2Rg/Da | 0.87 | ETamax/CT | 1.76 |
| Damin | 1.97 mm | dT | 0.27 mm |
| DL | 4.2 mm | dT/CT | 1.08 |
| Damin/DL | 0.43 | | |

Moreover, in the 1st example, an area of the dual molded lens element 110 is AL, an area of the light absorbing portion 112 is Aa, and Aa/AL=0.78002. In details, in the 1st example, $AL = pi*DL^2$, $Aa = pi*(Da^2 - Damin^2)$, $Aa/AL = (Da^2 - Damin^2)/DL^2 = 1 - (Damin/DL)^2$, and the values of the AL, Aa, and Aa/AL of the subsequent embodiments are also in accordance with the foregoing formula, but the disclosure is not limited thereto.

2nd Example

Figure 2A:
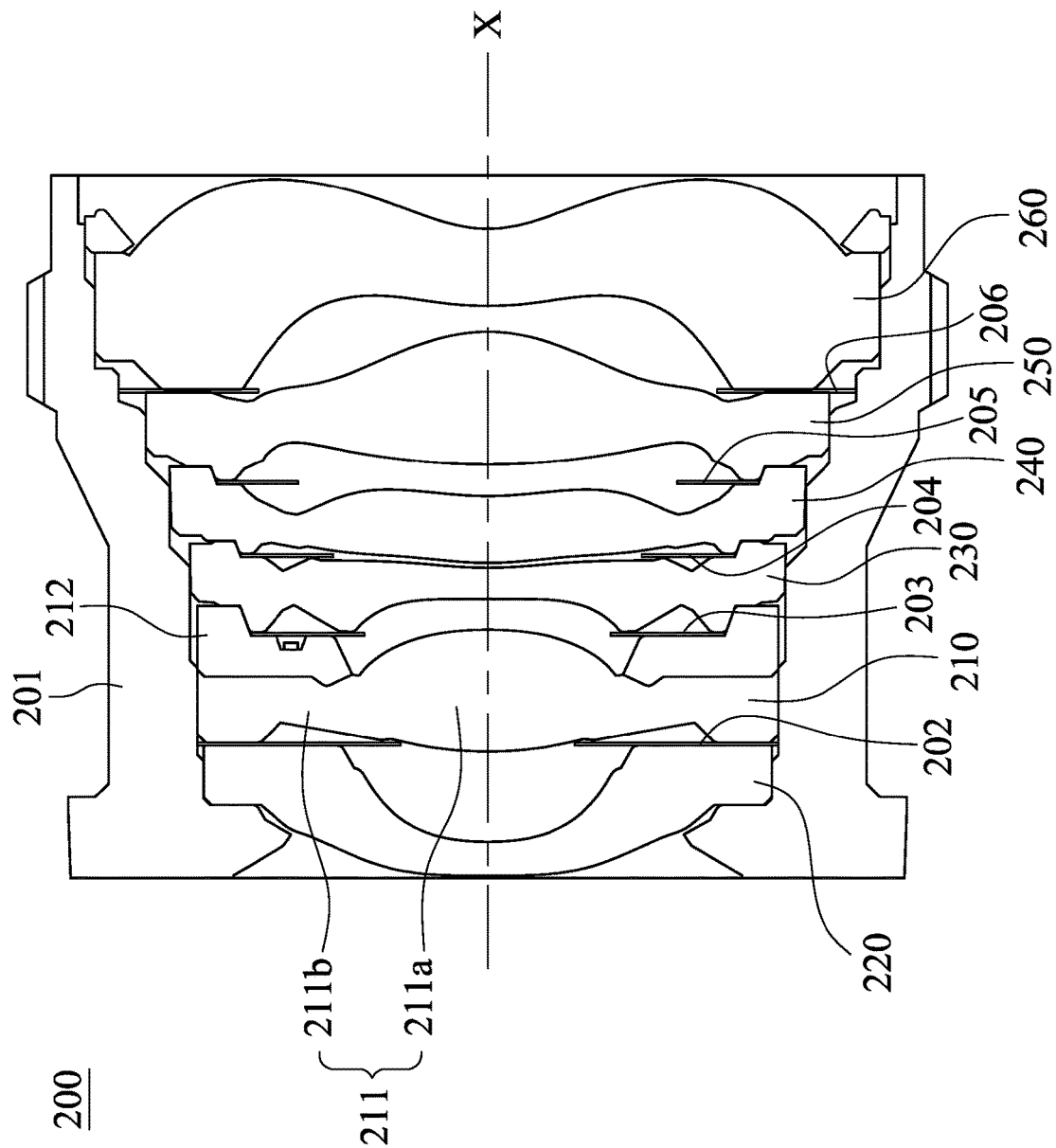
FIG. 2A is a schematic view of an optical lens assembly according to the 2nd example of the present disclosure.

FIG. 2A is a schematic view of an optical lens assembly 200 according to the 2nd example of the present disclosure. In FIG. 2A, the optical lens assembly 200 includes a lens barrel 201, a dual molded lens element 210 and a plurality of optical elements 220, 202, 203, 230, 204, 240, 205, 250, 206, 260, wherein the dual molded lens element 210 and the optical elements 220, 202, 203, 230, 204, 240, 205, 250, 206, 260 are disposed in the lens barrel 201, and the dual molded lens element 210 can be aligned with the optical elements 203, 230. In the 2nd example, the optical element 203 is a light shielding sheet, and the optical element 230 is a lens element.

FIG. 2B is a schematic view of the object-side surface 2101 of the dual molded lens element 210 according to the 2nd example of FIG. 2A, FIG. 2C is a schematic view of the dual molded lens element 210 according to the 2nd example of FIG. 2A, and FIG. 2D is a schematic view of the image-side surface 2102 of the dual molded lens element 210 according to the 2nd example of FIG. 2A. In FIGS. 2A, 2B, 2C and 2D, the dual molded lens element 210 has a central axis X and includes a light transmitting portion 211 and a light absorbing portion 212. The light transmitting portion 211 includes an optical effective region 211a and a lens peripheral region 211b, wherein the lens peripheral region 211b surrounds the optical effective region 211a. The light absorbing portion 212 surrounds the optical effective region 211a, and the light transmitting portion 211 and the light absorbing portion 212 are made of different plastic materials with different colors. The light transmitting portion 211 and the light absorbing portion 212 of the dual molded lens element 210 are integrally formed by an injection molding. In the 2nd example, the light transmitting portion 211 and the light absorbing portion 212 of the dual molded lens element 210 are formed by a dual-shot injection molding.

In FIG. 2D, the light absorbing portion 212 includes at least three gate portions 2121 surrounding the central axis X, wherein the gate portions 2121 are all located on a same surface of an object-side surface 2101 and an image-side surface 2102 of the dual molded lens element 210. In particular, according to the 2nd example, the number of the gate portions 2121 is three, and are all disposed on the image-side surface 2102 of the dual molded lens element 210.

Figure 2E:
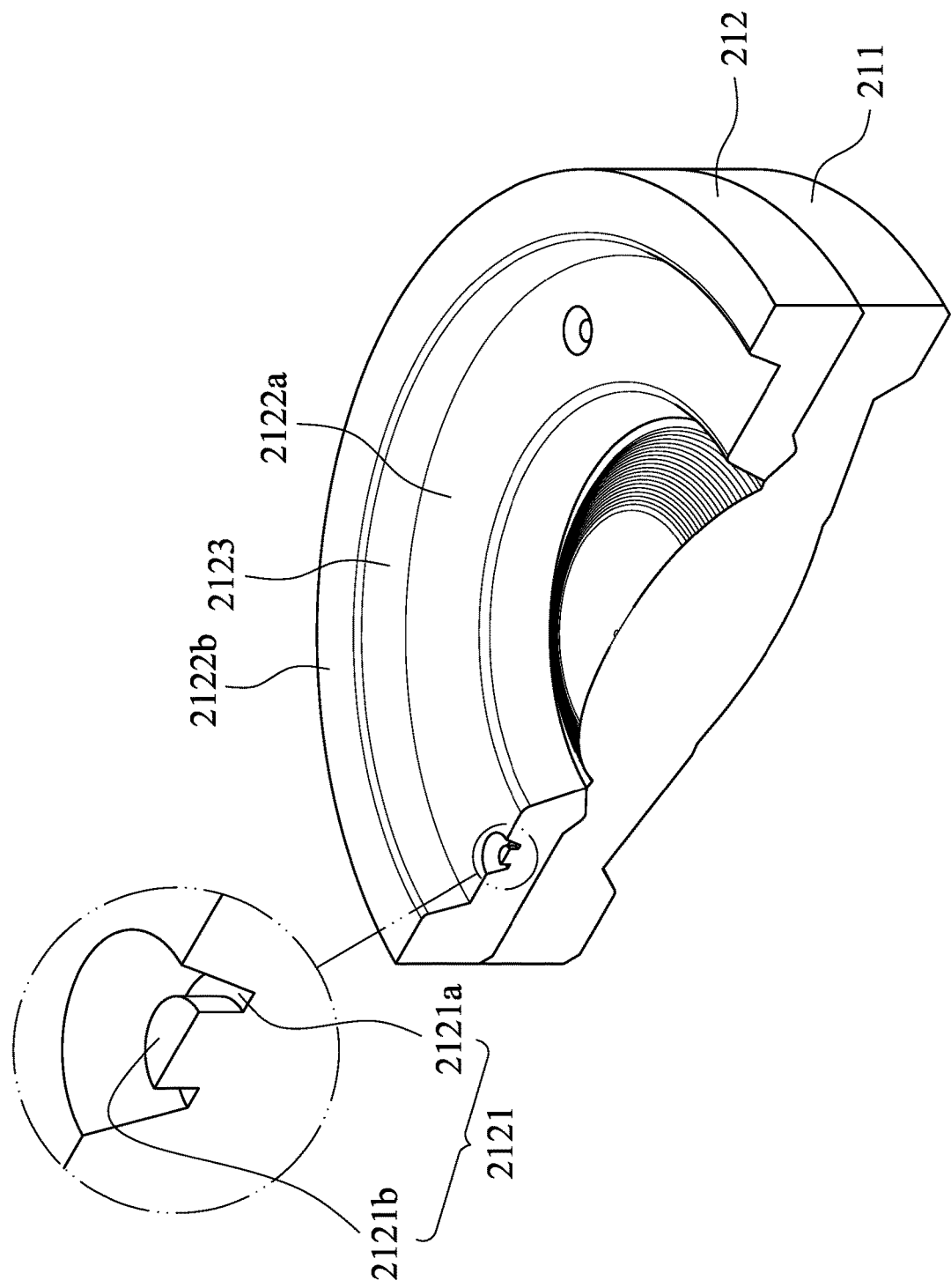
FIG. 2E is a schematic view of the gate portion according to the 2nd example of FIG. 2A.

FIG. 2E is a schematic view of the gate portions 2121 according to the 2nd example of FIG. 2A. In FIG. 2E, each of the gate portions 2121 can include a recess structure 2121a, and the gate portion mark 2121b is located on the recess structure 2121a.

The dual molded lens element 210 can further include an image-side axial connecting structure (its reference numeral is omitted), which includes an axial connecting surface 2123 and at least one image-side connecting surface 2122a, 2122b. In the 2nd example, the image-side axial connecting structure is disposed on the light absorbing portion 212, and the number of the image-side connecting surface 2122a, 2122b is two, wherein the image-side connecting surface 2122b is away from the optical effective region 211a than the axial connecting surface 2123 is therefrom. In FIG. 2A, the image-side axial connecting structure is for aligning the dual molded lens element 210 with the optical elements 203, 230 adjacent thereto.

Moreover, in the 2nd example, all of the gate portions 2121 are located on the image-side connecting surface 2122a, and the image-side connecting surface 2122a is perpendicular to the central axis X. That is, all of the gate portions 2121 are located on a same plane.

Figure 2F:
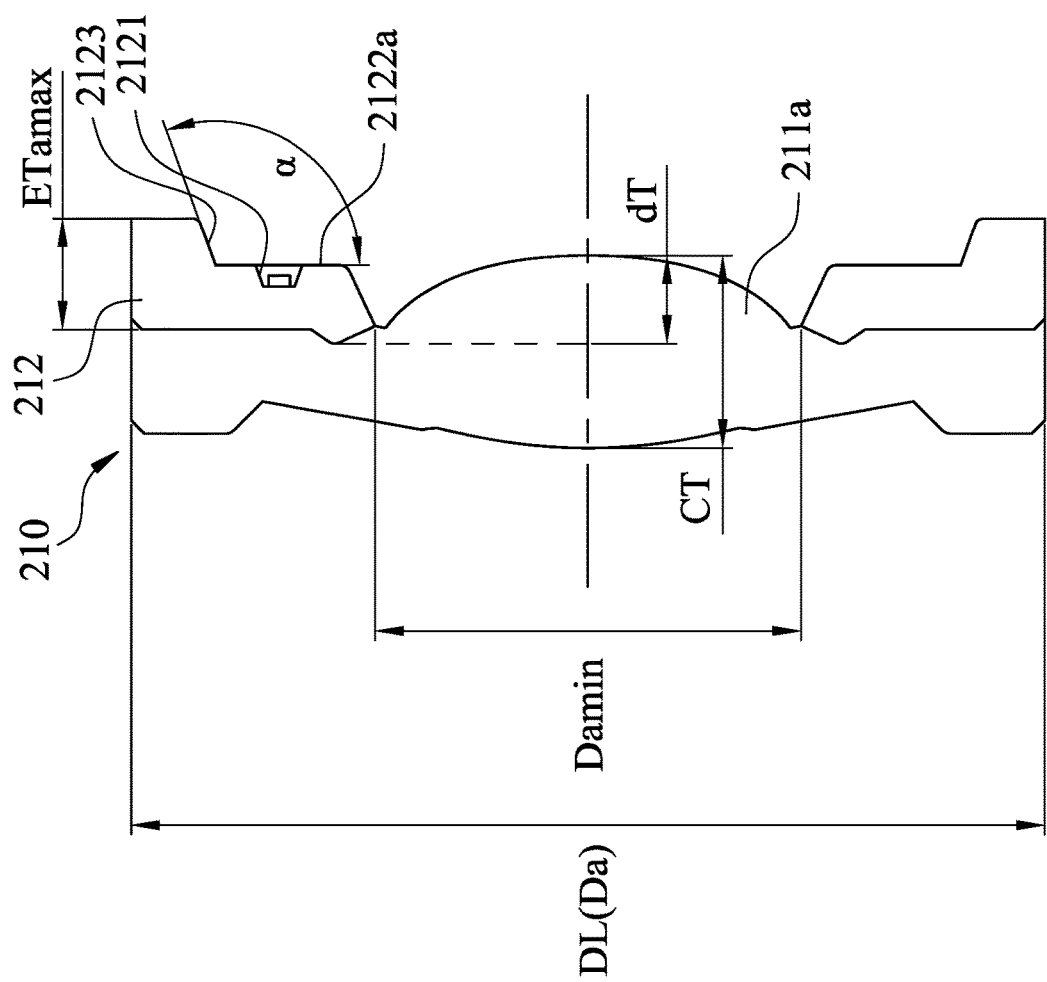
FIG. 2F is a schematic view of the parameters according to the 2nd example of FIG. 2A.
Figure 2G:
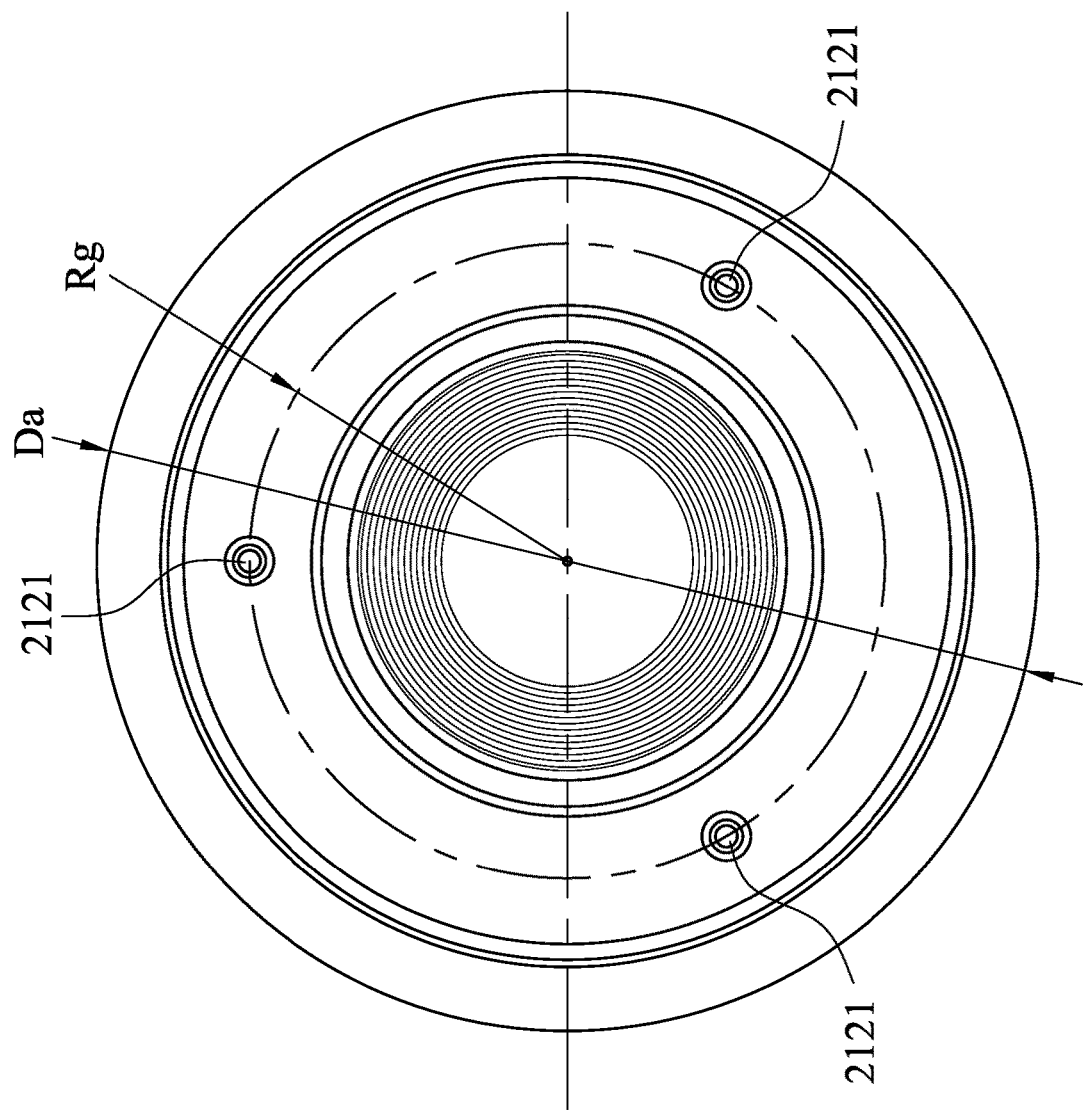
FIG. 2G is another schematic view of the parameters according to the 2nd example of FIG. 2A.

FIGS. 2F and 2G which are schematic views of the parameters according to the 2nd example of FIG. 2A, respectively. In FIGS. 2F and 2G, when a farthest vertical distance between the gate portion 2121 and the central axis X is Rg (in the 2nd example, the farthest vertical distances between three of the gate portions 2121 and the central axis X are all the same), an outer diameter of the light absorbing portion 212 is Da, a minimum opening diameter of the light absorbing portion 212 surrounding the optical effective region 211a is Damin, an outer diameter of the dual molded lens element 210 is DL (in the 2nd example, DL=Da), a maximum thickness of the light absorbing portion 212 is ETamax, a thickness of the dual molded lens element 210 close to the central axis X is CT, a gap between a region projected by the light absorbing portion 212 onto the central axis X and a central thickness region of the dual molded lens element 210 is dT, and an angle between the axial connecting surface 2123 and the image-side connecting surface 2122a is α, the following conditions of Table 2 are satisfied, respectively.

TABLE 2

| the 2nd example | | | |
|---|---|---|---|
| Rg | 1.45 mm | ETamax | 0.52 mm |
| Da | 4.29 mm | CT | 0.9 mm |
| 2Rg/Da | 0.68 | ETamax/CT | 0.58 |
| Damin | 2 mm | dT | −0.4134 mm |
| DL | 4.29 mm | dT/CT | −0.46 |
| Damin/DL | 0.46 | | |
| α | 110 degrees | | |

Moreover, in the 2nd example, an area of the dual molded lens element 210 is AL, an area of the light absorbing portion 212 is Aa, and Aa/AL=0.78266.

3rd Example

Figure 3A:
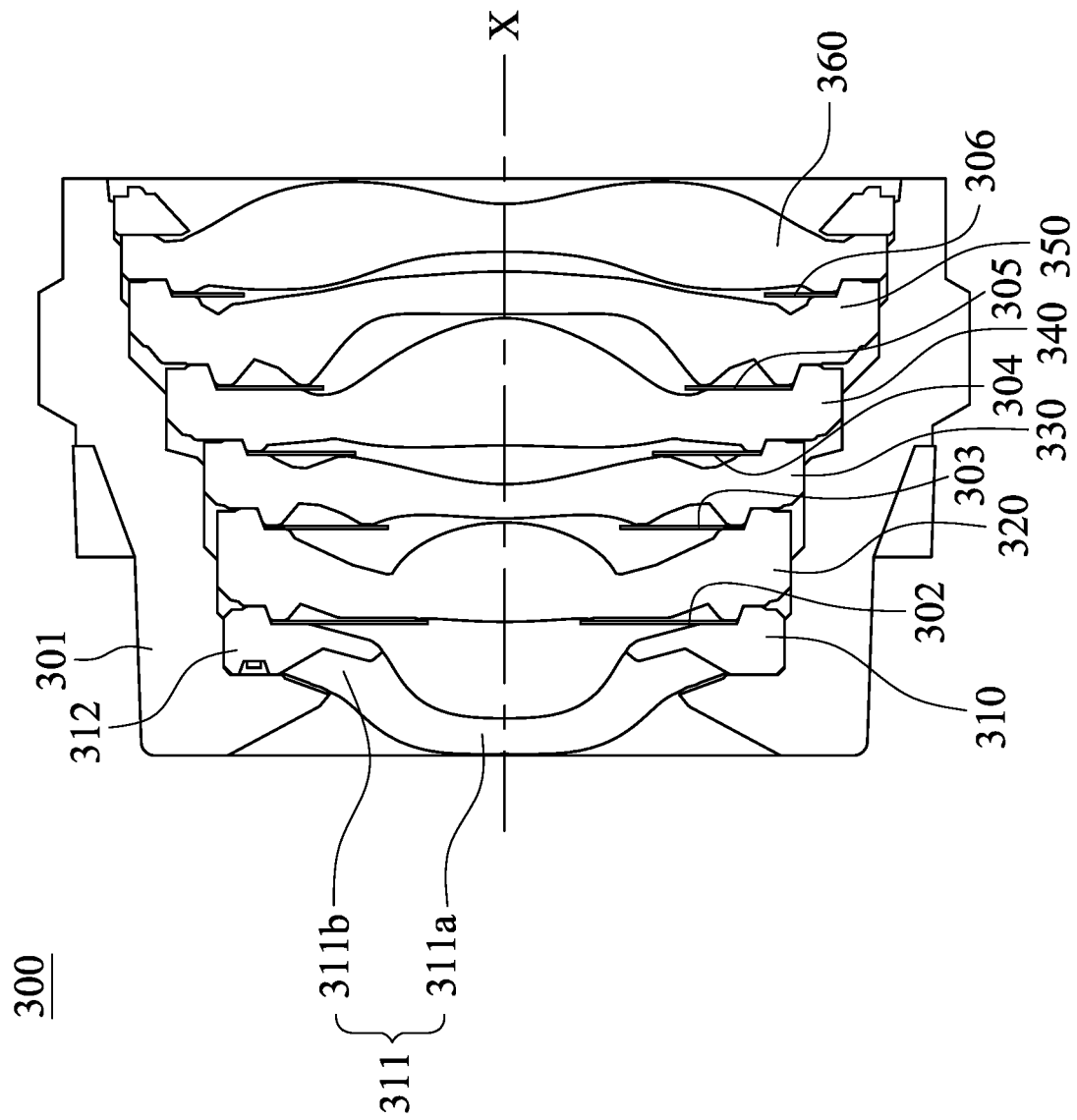
FIG. 3A is a schematic view of an optical lens assembly according to the 3rd example of the present disclosure.

FIG. 3A is a schematic view of an optical lens assembly 300 according to the 2nd example of the present disclosure. In FIG. 3A, the optical lens assembly 300 includes a lens barrel 301, a dual molded lens element 310 and a plurality of optical elements 302, 320, 303, 330, 304, 340, 305, 350, 306, 360, wherein the dual molded lens element 310 and the optical elements 302, 320, 303, 330, 304, 340, 305, 350, 306, 360 are disposed in the lens barrel 301, and the dual molded lens element 310 can be aligned with the optical elements 302, 320. In the 3rd example, the optical element 302 is a light shielding sheet, and the optical element 320 is a lens element.

Figures 3B, 3C, 3D:
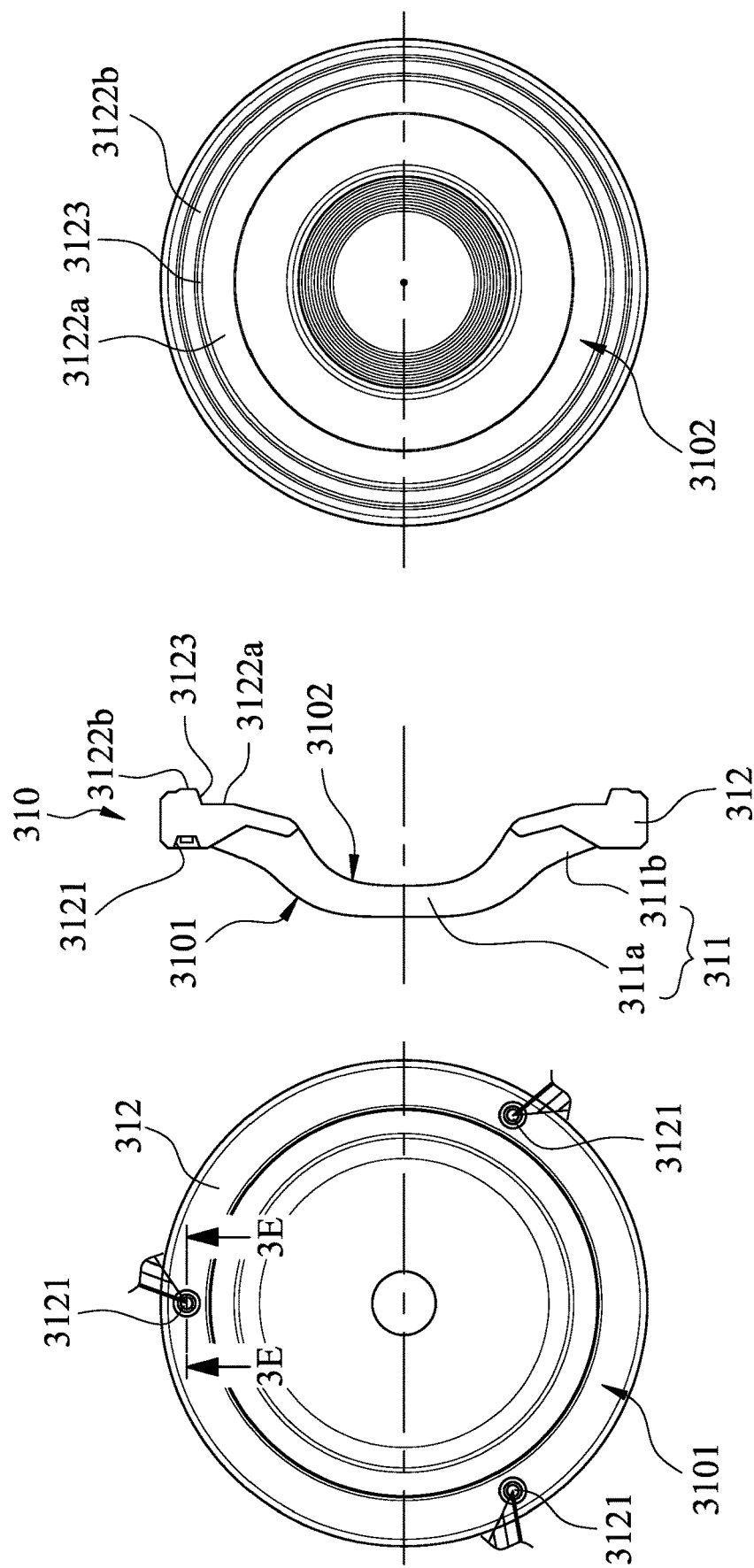
FIG. 3B is a schematic view of the object-side surface of the dual molded lens element according to the 3rd example of FIG. 3A.
FIG. 3C is a schematic view of the dual molded lens element according to the 3rd example of FIG. 3A.
FIG. 3D is a schematic view of the image-side surface of the dual molded lens element according to the 3rd example of FIG. 3A.

FIG. 3B is a schematic view of the object-side surface 3101 of the dual molded lens element 310 according to the 3rd example of FIG. 3A, FIG. 3C is a schematic view of the dual molded lens element 310 according to the 2nd example of FIG. 3A, and FIG. 3D is a schematic view of the image-side surface 3102 of the dual molded lens element 310 according to the 3rd example of FIG. 3A. In FIGS. 3A, 3B, 3C and 3D, the dual molded lens element 310 has a central axis X and includes a light transmitting portion 311 and a light absorbing portion 312. The light transmitting portion 311 includes an optical effective region 311a and a lens peripheral region 311b, wherein the lens peripheral region 311b surrounds the optical effective region 311a. The light absorbing portion 312 surrounds the optical effective region 311a, and the light transmitting portion 311 and the light absorbing portion 312 are made of different plastic materials with different colors. The light transmitting portion 311 and the light absorbing portion 312 of the dual molded lens element 310 are integrally formed by an injection molding. In the 3rd example, the light transmitting portion 311 and the light absorbing portion 312 of the dual molded lens element 310 are formed by a dual-shot injection molding.

Figure 3E:
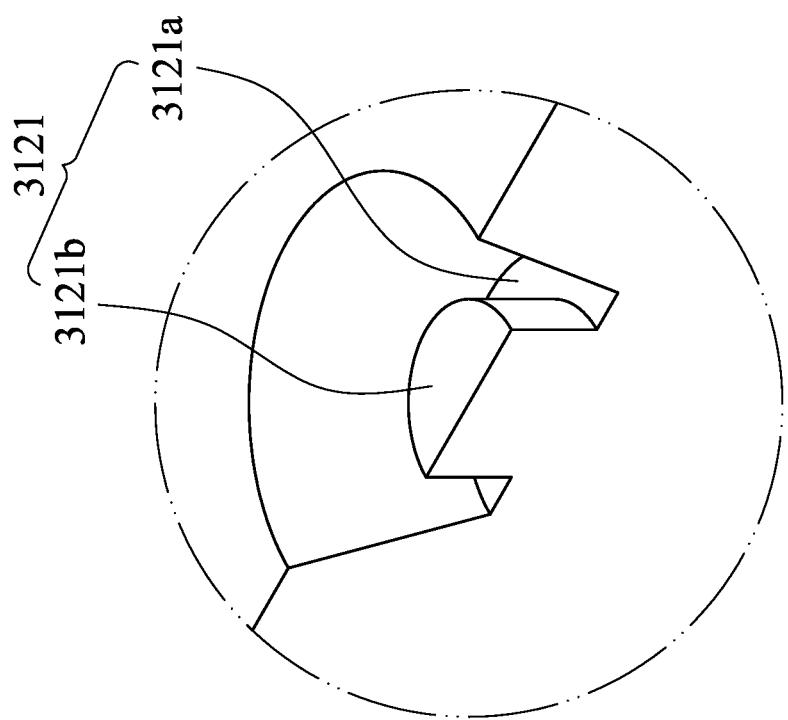
FIG. 3E is a schematic view taken along line 3E-3E in FIG. 3B.
Figure 3F:
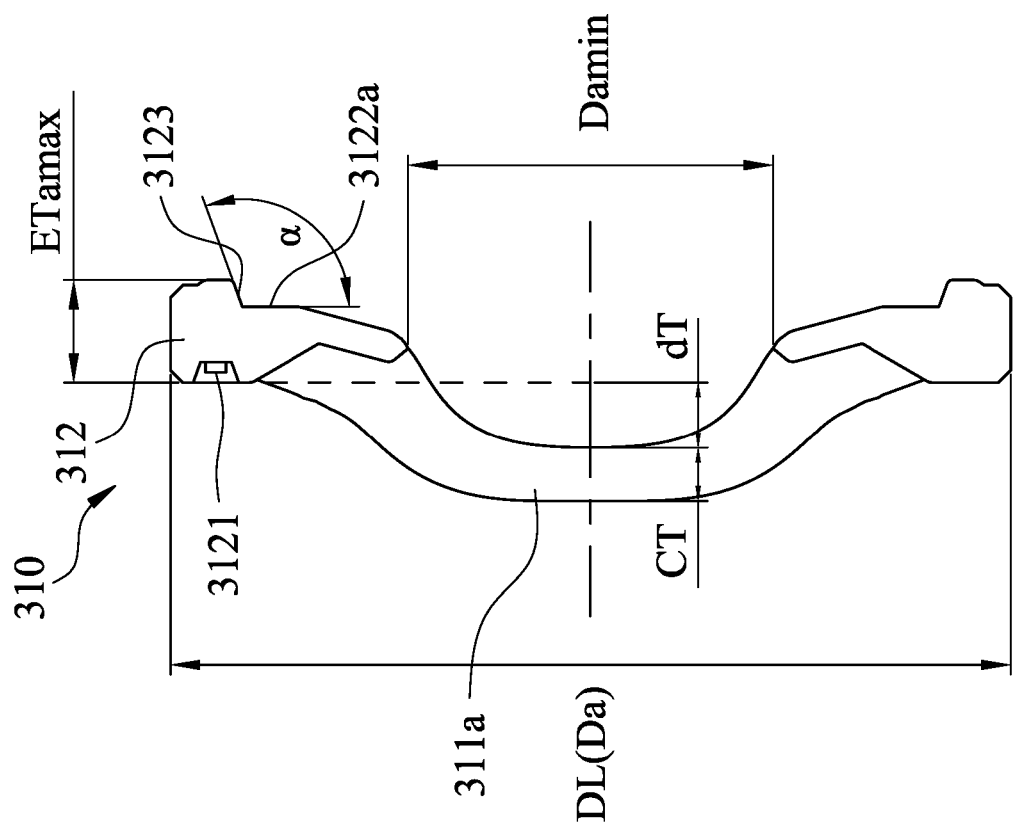
FIG. 3F is a schematic view of the parameters according to the 3rd example of FIG. 3A.

In FIGS. 3A and 3C, the region where the light absorbing portion 312 is projected onto the central axis X does not overlap with the region of the dual molded lens element 310 on the central axis X (as shown in FIG. 3F).

In FIG. 3B, the light absorbing portion 312 includes at least three gate portions 3121 surrounding the central axis X, wherein the gate portions 3121 are all located on a same surface of an object-side surface 3101 and an image-side surface 3102 of the dual molded lens element 310. In particular, according to the 3rd example, the number of the gate portions 3121 is three, and are all disposed on the object-side surface 3101 of the dual molded lens element 310.

FIG. 3E is a schematic view taken along line 3E-3E in FIG. 3B. In FIG. 3E, each of the gate portions 3121 can include a recess structure 3121a, and the gate portion mark 3121b is located on the recess structure 3121a.

In FIGS. 3C and 3D, the dual molded lens element 310 can further include an image-side axial connecting structure (its reference numeral is omitted), which includes an axial connecting surface 3123 and at least one image-side connecting surface 3122a, 3122b. In the 3rd example, the image-side axial connecting structure is disposed on the light absorbing portion 312, and the number of the image-side connecting surface 3122a, 2122b is two, wherein the image-side connecting surface 3122b is away from the optical effective region 311a than the axial connecting surface 3123 is therefrom. In FIG. 3A, the image-side axial connecting structure is for aligning the dual molded lens element 310 with the optical elements 302, 320 adjacent thereto.

Figure 3G:
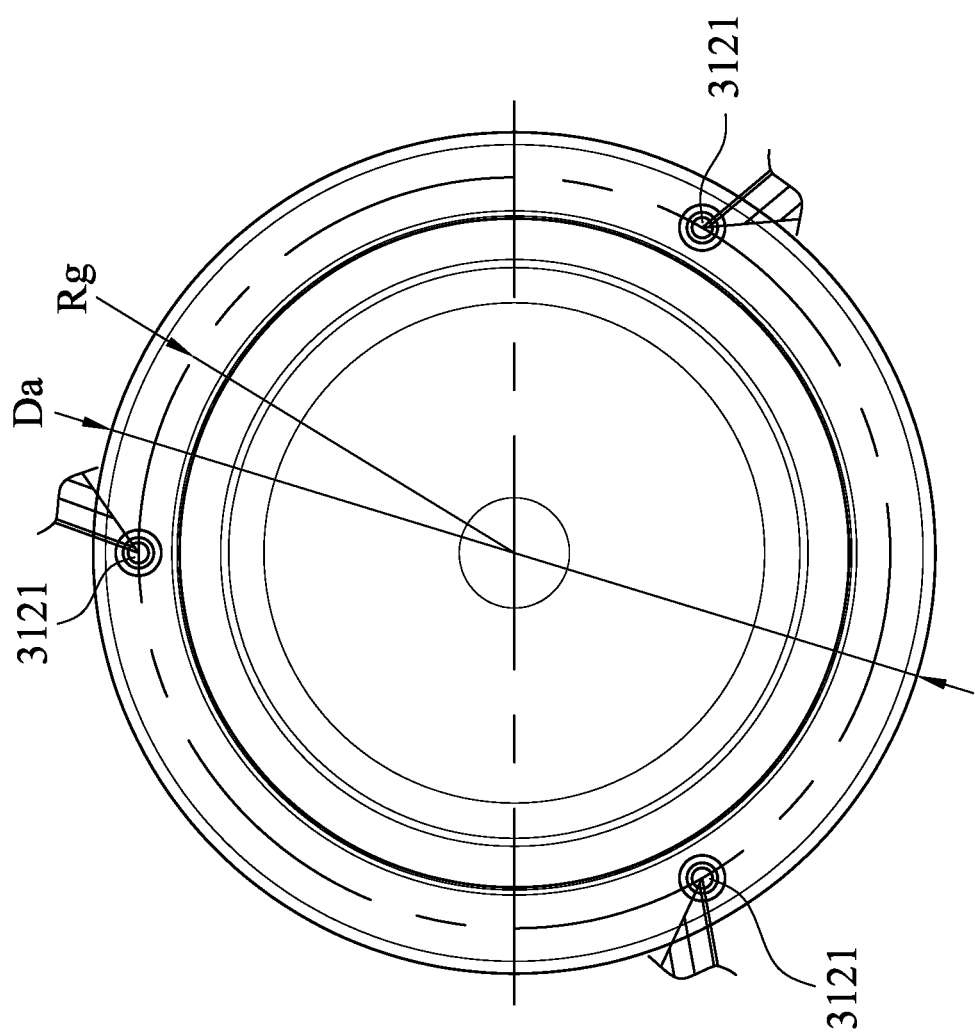
FIG. 3G is another schematic view of the parameters according to the 3rd example of FIG. 3A.

FIGS. 3F and 3G which are schematic views of the parameters according to the 3rd example of FIG. 3A, respectively. In FIGS. 3F and 3G, when a farthest vertical distance between the gate portion 3121 and the central axis X is Rg (in the 3rd example, the farthest vertical distances between three of the gate portions 3121 and the central axis X are all the same), an outer diameter of the light absorbing portion 312 is Da, a minimum opening diameter of the light absorbing portion 312 surrounding the optical effective region 311a is Damin, an outer diameter of the dual molded lens element 310 is DL (in the 3rd example, DL=Da), a maximum thickness of the light absorbing portion 312 is ETamax, a thickness of the dual molded lens element 310 close to the central axis X is CT, a gap between a region projected by the light absorbing portion 312 onto the central axis X and a central thickness region of the dual molded lens element 310 is dT, and an angle between the axial connecting surface 3123 and the image-side connecting surface 2122a is α, the following conditions of Table 3 are satisfied, respectively.

TABLE 3 the 3th example

| Rg | 1.83 mm | ETamax | 0.5 mm |
|---|---|---|---|
| Da | 4.1 mm | CT | 0.26 mm |
| 2Rg/Da | 0.89 | ETamax/CT | 1.92 |
| Damin | 1.78 mm | dT | 0.319 mm |
| DL | 4.1 mm | dT/CT | 1.23 |
| Damin/DL | 0.43 | | |
| α | 110 degrees | | |

Moreover, in the 3rd example, an area of the dual molded lens element 310 is AL, an area of the light absorbing portion 312 is Aa, and Aa/AL=0.811517.

4th Example

Figure 4A:
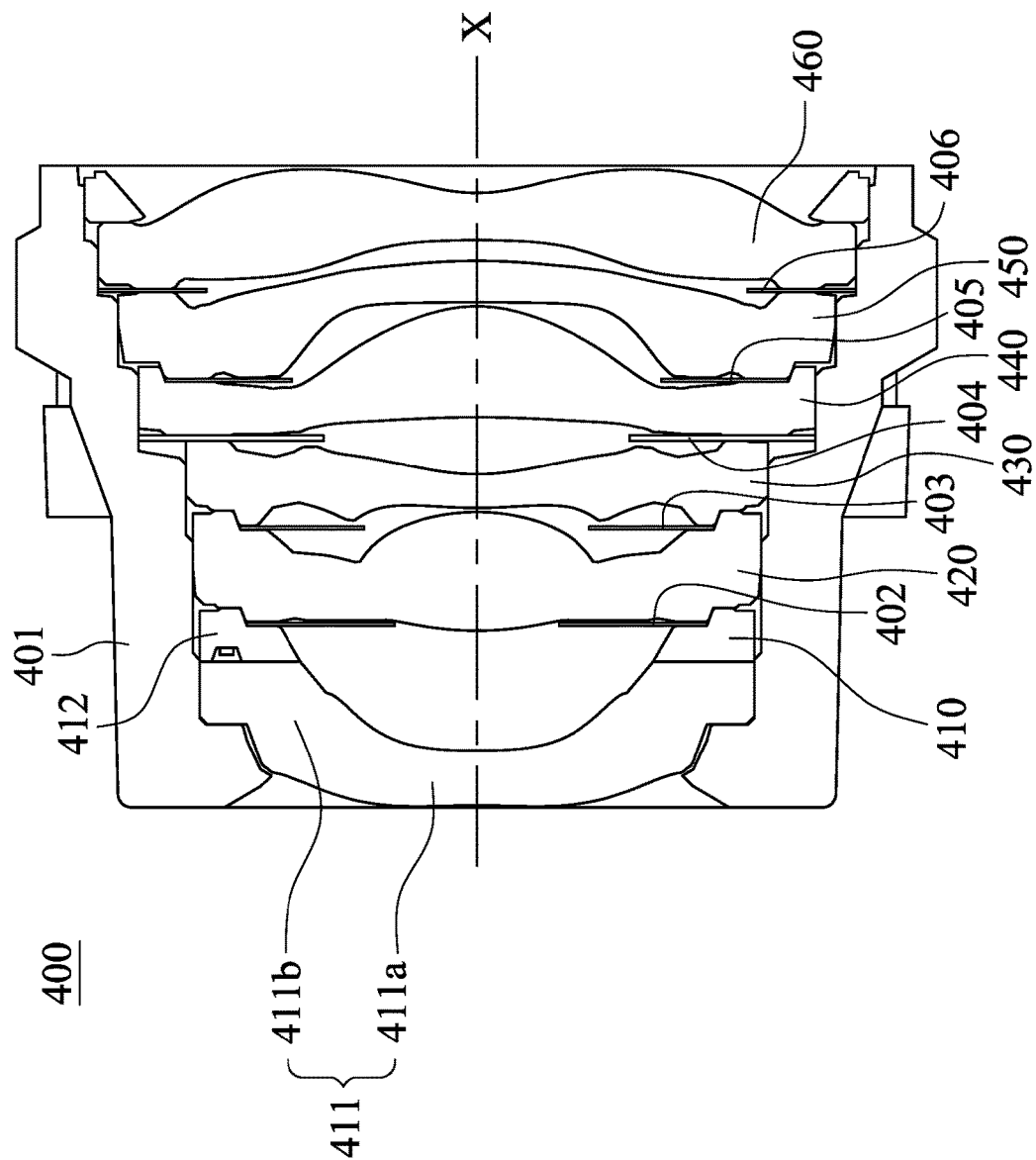
FIG. 4A is a schematic view of an optical lens assembly according to the 4th example of the present disclosure.

FIG. 4A is a schematic view of an optical lens assembly 400 according to the 4th example of the present disclosure. In FIG. 4A, the optical lens assembly 400 includes a lens barrel 401, a dual molded lens element 410 and a plurality of optical elements 402, 420, 403, 430, 404, 440, 405, 450, 406, 460, wherein the dual molded lens element 410 and the optical elements 402, 420, 403, 430, 404, 440, 405, 450, 406, 460 are disposed in the lens barrel 401, and the dual molded lens element 410 can be aligned with the optical elements 402, 420. In the 4th example, the optical element 402 is a light shielding sheet, and the optical element 420 is a lens element.

Figure 4D:
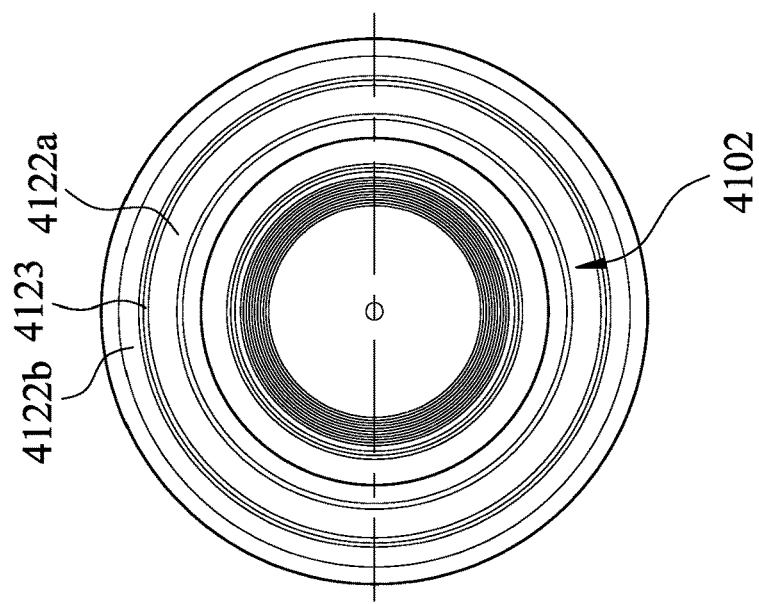
FIG. 4D is a schematic view of the image-side surface of the dual molded lens element according to the 4th example of FIG. 4A.
Figure 4C:
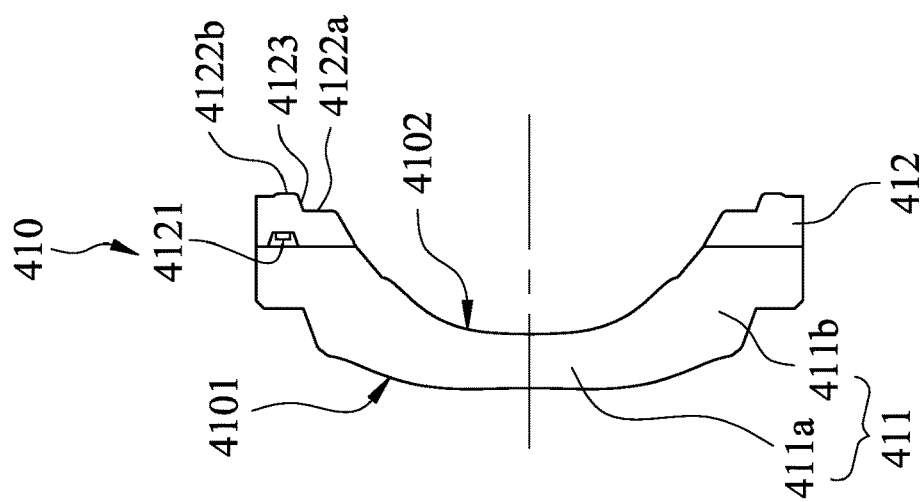
FIG. 4C is a schematic view of the dual molded lens element according to the 4th example of FIG. 4A.
Figure 4B:
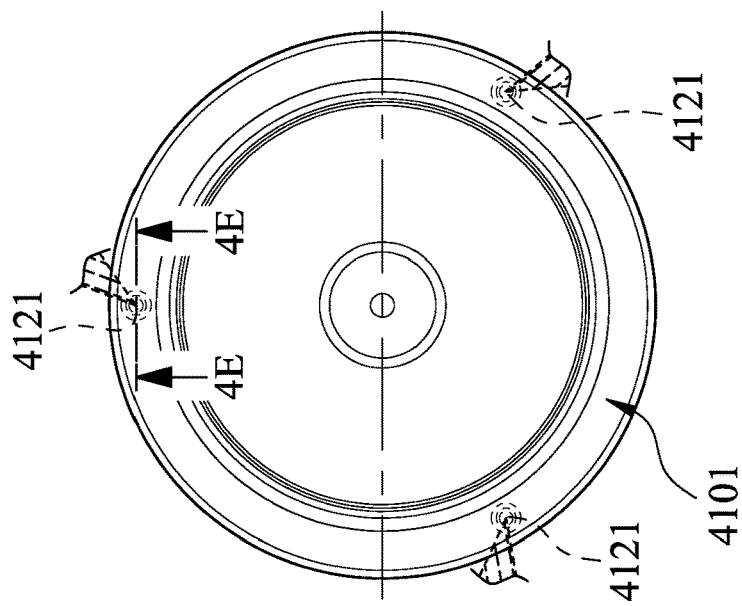
FIG. 4B is a schematic view of the object-side surface of the dual molded lens element according to the 4th example of FIG. 4A.

FIG. 4B is a schematic view of the object-side surface 4101 of the dual molded lens element 310 according to the 4th example of FIG. 4A, FIG. 4C is a schematic view of the dual molded lens element 410 according to the 4th example of FIG. 4A, and FIG. 4D is a schematic view of the image-side surface 4102 of the dual molded lens element 410 according to the 4th example of FIG. 4A. In FIGS. 4A, 4B, 4C and 4D, the dual molded lens element 410 has a central axis X and includes a light transmitting portion 411 and a light absorbing portion 412. The light transmitting portion 411 includes an optical effective region 411a and a lens peripheral region 411b, wherein the lens peripheral region 411b surrounds the optical effective region 411a. The light absorbing portion 412 surrounds the optical effective region 411a, and the light transmitting portion 411 and the light absorbing portion 412 are made of different plastic materials with different colors. The light transmitting portion 411 and the light absorbing portion 412 of the dual molded lens element 410 are integrally formed by an injection molding. In the 4th example, the light transmitting portion 411 and the light absorbing portion 412 of the dual molded lens element 410 are formed by a dual-shot injection molding.

Figure 4E:
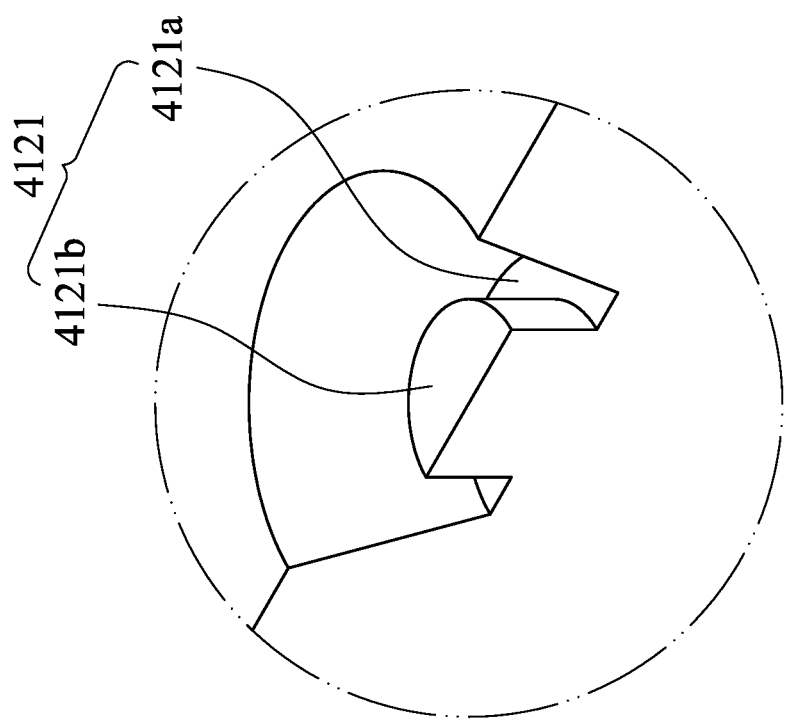
FIG. 4E is a schematic view taken along line 4E-4E in FIG. 4B.
Figure 4F:
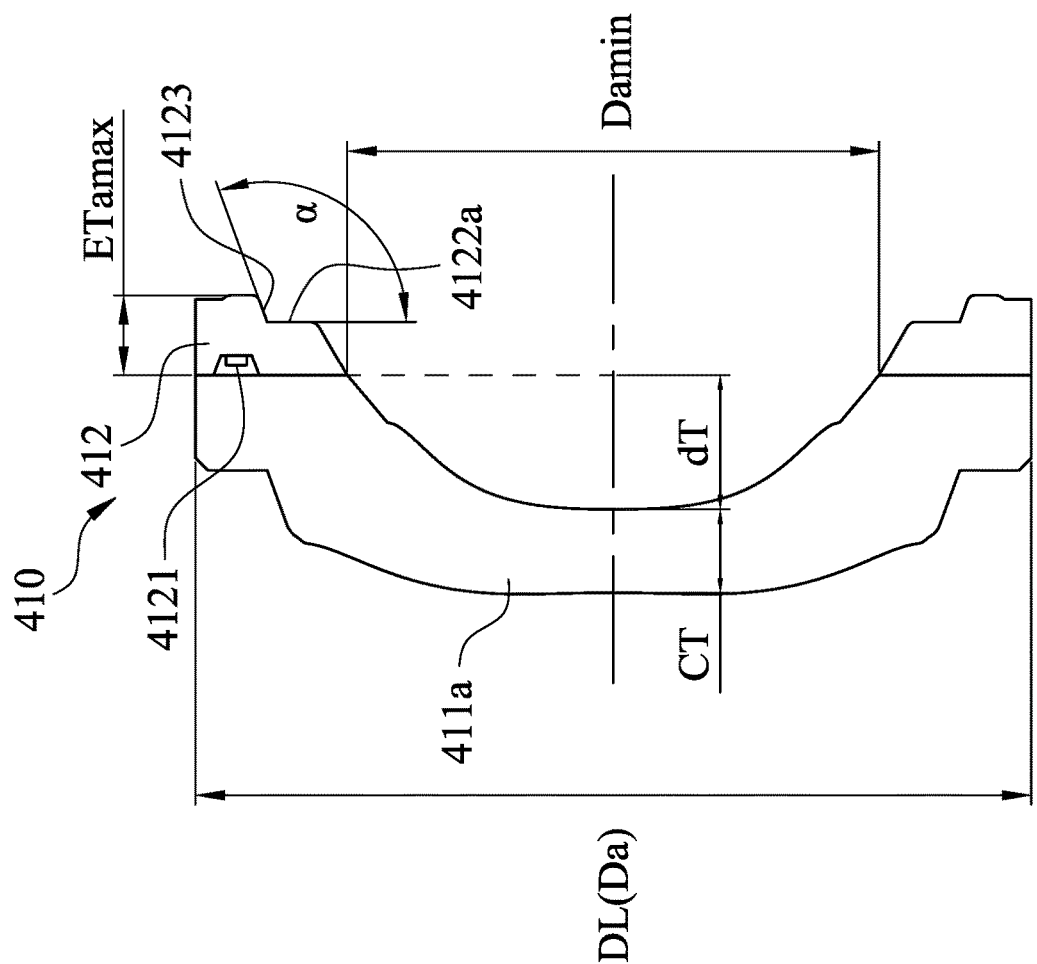
FIG. 4F is a schematic view of the parameters according to the 4th example of FIG. 4A.

In FIGS. 4A and 4C, the region where the light absorbing portion 412 is projected onto the central axis X does not overlap with the region of the dual molded lens element 410 on the central axis X (as shown in FIG. 4F).

In FIG. 4B, the light absorbing portion 412 includes at least three gate portions 4121 surrounding the central axis X. In particular, the number of the gate portions 4121 is three, and are all disposed on the object-side surface 4101 of the light absorbing portion 412. In detail, in the 4th example, the light transmitting portion 411 is made of a transparent material, so that the gate portions 4121 can be seen through from the object-side surface 4101 after the dual molded lens element 410 is formed.

FIG. 4E is a schematic view taken along line 4E-4E in FIG. 4B. In FIG. 4E, each of the gate portions 4121 can include a recess structure 4121a, and the gate portion mark 4121b is located on the recess structure 4121a.

In FIGS. 4C and 4D, the dual molded lens element 410 can further include an image-side axial connecting structure (its reference numeral is omitted), which includes an axial connecting surface 4123 and at least one image-side connecting surface 4122a, 3122b. In the 4th example, the image-side axial connecting structure is disposed on the light absorbing portion 412, and the number of the image-side connecting surface 4122a, 2122b is two, wherein the image-side connecting surface 4122b is away from the optical effective region 411a than the axial connecting surface 4123 is therefrom. In FIG. 4A, the image-side axial connecting structure is for aligning the dual molded lens element 410 with the optical elements 402, 420 adjacent thereto.

Figure 4G:
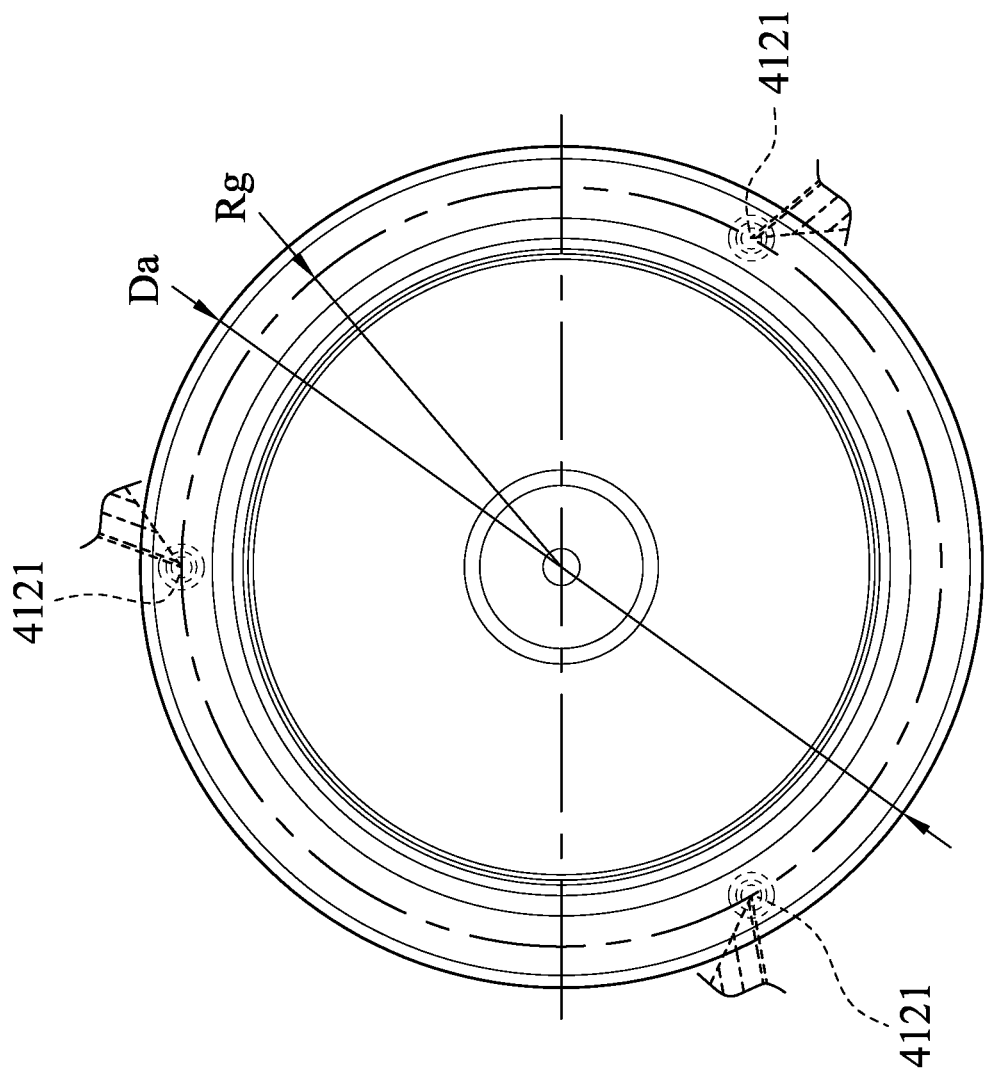
FIG. 4G is another schematic view of the parameters according to the 4th example of FIG. 4A.

FIGS. 4F and 4G which are schematic views of the parameters according to the 4th example of FIG. 4A, respectively. In FIGS. 4F and 4G, when a farthest vertical distance between the gate portion 4121 and the central axis X is Rg (in the 4th example, the farthest vertical distances between three of the gate portions 4121 and the central axis X are all the same), an outer diameter of the light absorbing portion 412 is Da, a minimum opening diameter of the light absorbing portion 412 surrounding the optical effective region 411a is Damin, an outer diameter of the dual molded lens element 410 is DL (in the 4th example, DL=Da), a maximum thickness of the light absorbing portion 412 is ETamax, a thickness of the dual molded lens element 410 close to the central axis X is CT, a gap between a region projected by the light absorbing portion 412 onto the central axis X and a central thickness region of the dual molded lens element 410 is dT, and an angle between the axial connecting surface 4123 and the image-side connecting surface 4122a is α, the following conditions of Table 4 are satisfied, respectively.

TABLE 4 the 4th example

| Rg | 1.85 mm | ETamax | 0.39 mm |
|---|---|---|---|
| Da | 4.1 mm | CT | 0.41 mm |
| 2Rg/Da | 0.9 | ETamax/CT | 0.95 |

TABLE 4-continued the 4th example

| Damin | 2.61 mm | dT | 0.66 mm |
|---|---|---|---|
| DL | 4.1 mm | dT/CT | 1.61 |
| Damin/DL | 0.64 | | |
| α | 110 degrees | | |

Moreover, in the 4th example, an area of the dual molded lens element 410 is AL, an area of the light absorbing portion 412 is Aa, and Aa/AL=0.59476.

5th Example

Figure 5A:
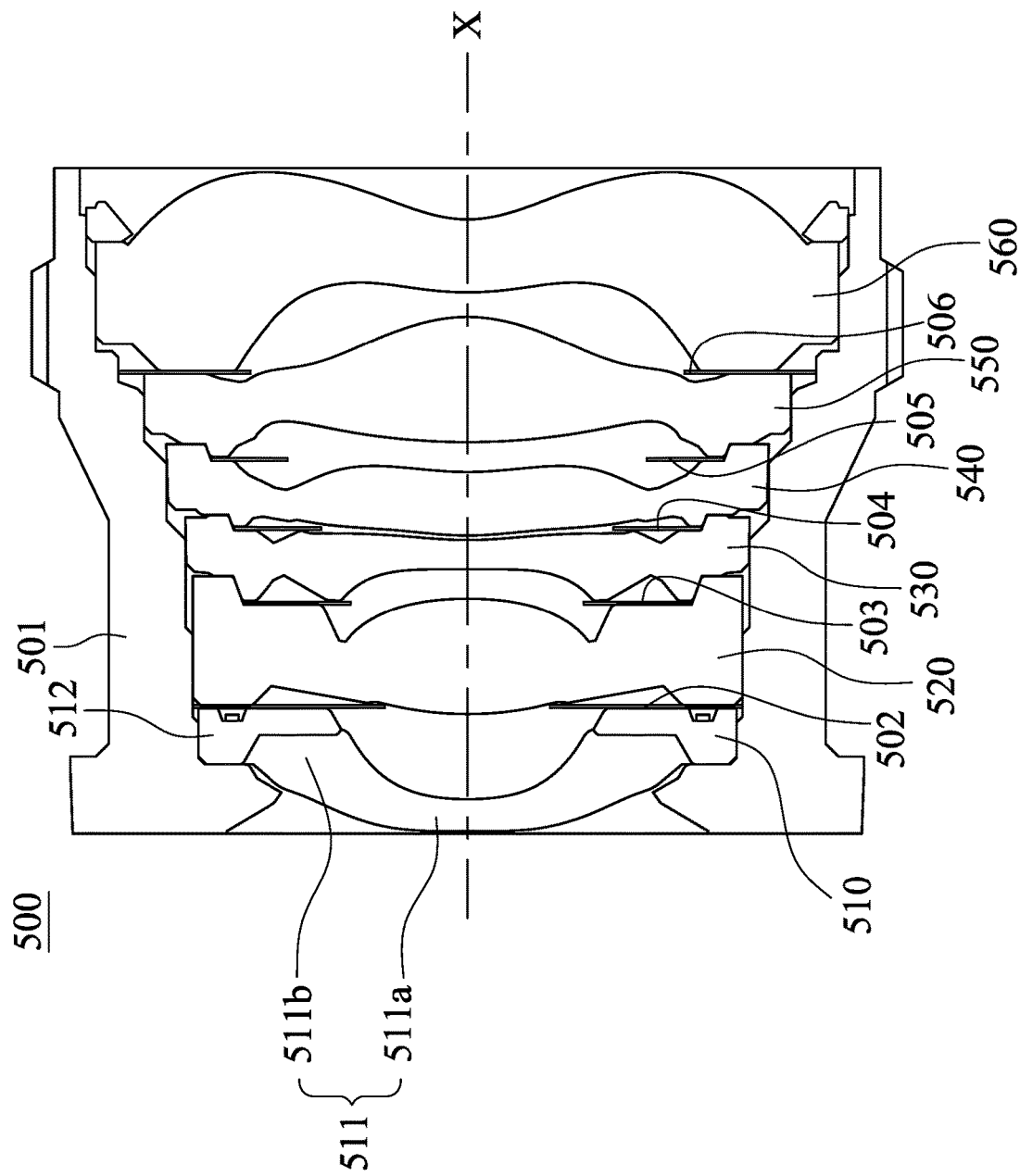
FIG. 5A is a schematic view of an optical lens assembly according to the 5th example of the present disclosure.

FIG. 5A is a schematic view of an optical lens assembly 500 according to the 5th example of the present disclosure. In FIG. 5A, the optical lens assembly 500 includes a lens barrel 501, a dual molded lens element 510 and a plurality of optical elements 502, 520, 503, 530, 504, 540, 505, 550, 506, 560, wherein the dual molded lens element 510 and the optical elements 502, 520, 503, 530, 504, 540, 505, 550, 506, 560 are disposed in the lens barrel 501, and the dual molded lens element 510 can be aligned with the optical element 502. In the 5th example, the optical element 502 is a light shielding sheet.

FIG. 5B is a schematic view of the object-side surface 5101 of the dual molded lens element 510 according to the 5th example of FIG. 5A, FIG. 5C is a schematic view of the dual molded lens element 510 according to the 5th example of FIG. 5A, and FIG. 5D is a schematic view of the image-side surface 5102 of the dual molded lens element 510 according to the 5th example of FIG. 5A. In FIGS. 5A, 5B, 5C and 5D, the dual molded lens element 510 has a central axis X and includes a light transmitting portion 511 and a light absorbing portion 512. The light transmitting portion 511 includes an optical effective region 511a and a lens peripheral region 511b, wherein the lens peripheral region 511b surrounds the optical effective region 511a. The light absorbing portion 512 surrounds the optical effective region 511a, and the light transmitting portion 511 and the light absorbing portion 512 are made of different plastic materials with different colors. The light transmitting portion 511 and the light absorbing portion 512 of the dual molded lens element 510 are integrally formed by an injection molding. In the 5th example, the light transmitting portion 511 and the light absorbing portion 512 of the dual molded lens element 510 are formed by a dual-shot injection molding.

Figure 5E:
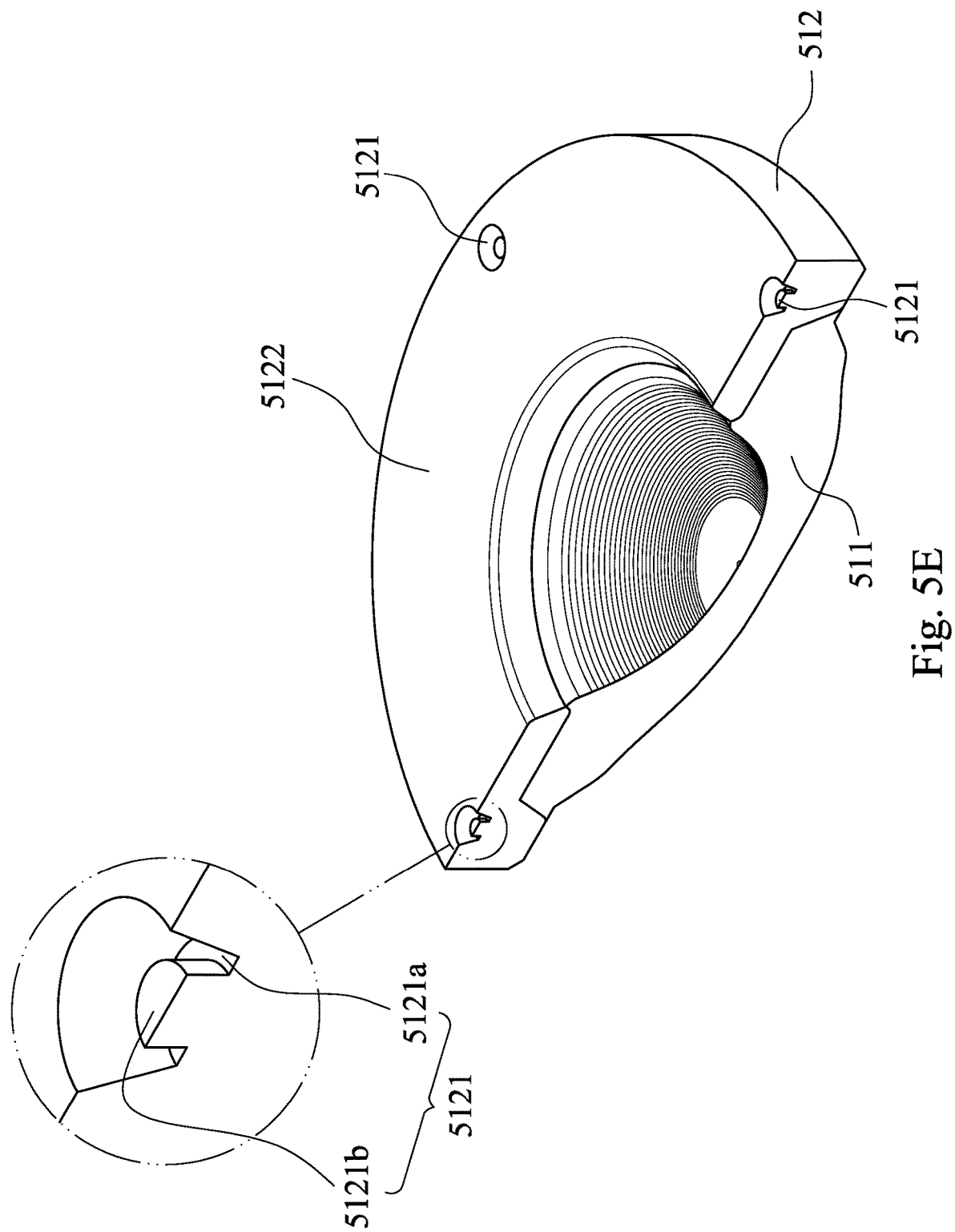
FIG. 5E is a schematic view of the gate portion according to the 5th example of FIG. 5A.
Figure 5F:
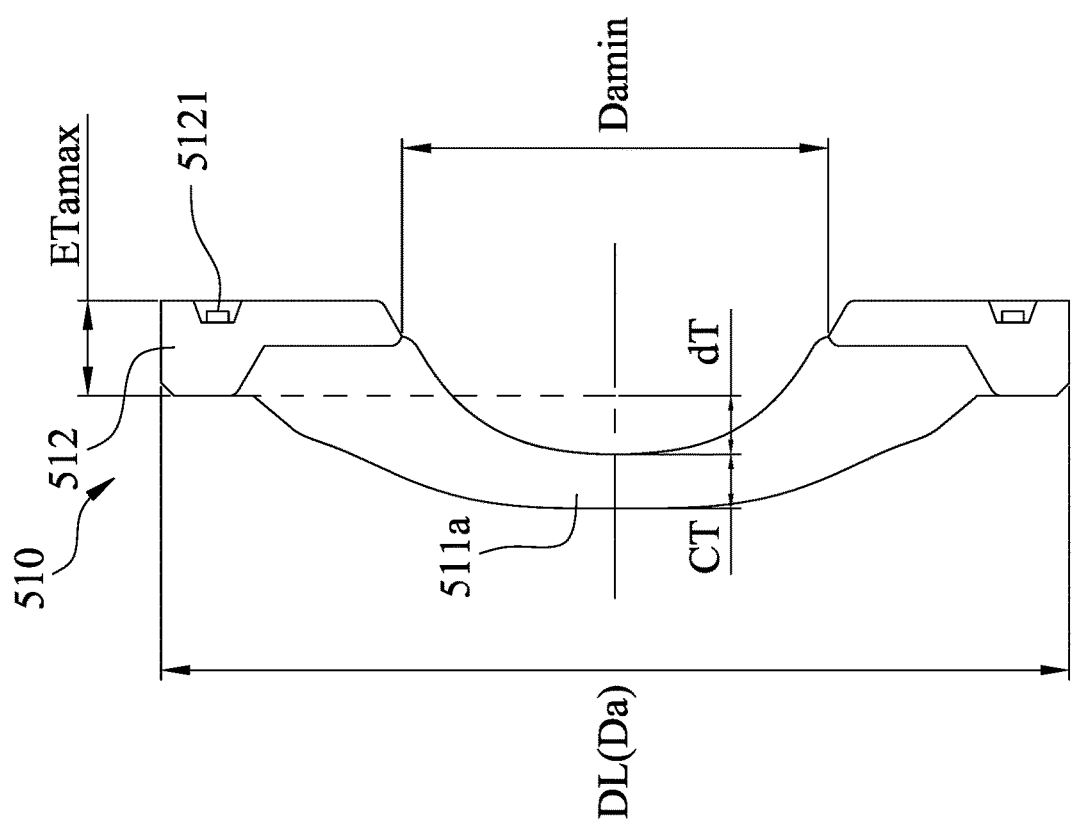
FIG. 5F is a schematic view of the parameters according to the 5th example of FIG. 5A.

In FIGS. 5A and 5C, the region where the light absorbing portion 512 is projected onto the central axis X does not overlap with the region of the dual molded lens element 510 on the central axis X (as shown in FIG. 5F).

In FIG. 5D, the light absorbing portion 512 includes at least three gate portions 5121 surrounding the central axis X, wherein the gate portions 5121 are all located on a same surface of an object-side surface 5101 and an image-side surface 5102 of the dual molded lens element 510. In particular, according to the 5th example, the number of the gate portions 5121 is four, and are all disposed on the image-side surface 5102 of the dual molded lens element 510.

FIG. 5E is a schematic view of the gate portions 5121 according to the 5th example of FIG. 5A. In FIG. 5E, each of the gate portions 5121 can include a recess structure 5121a, and the gate portion mark 5121b is located on the recess structure 5121a. The dual molded lens element 510 can further include at least one image-side connecting surface 5122 located on the image-side surface 5102 of the dual molded lens element 510 for connecting to an optical element 502 adjacent to the dual molded lens element 510 in the optical lens assembly 500, wherein the image-side connecting surface 5122 surrounds the optical effective region 511a, and all of the recess structure 5121a are disposed on the image-side connecting surface 5122. In the 5th example, the number of the image-side connecting surface 5122 is one, and it is perpendicular to the central axis X, and all of the gate portions 5121 are located on the image-side connecting surface 1122. That is, all of the gate portions 5121 are located on a same plane.

Figure 5G:
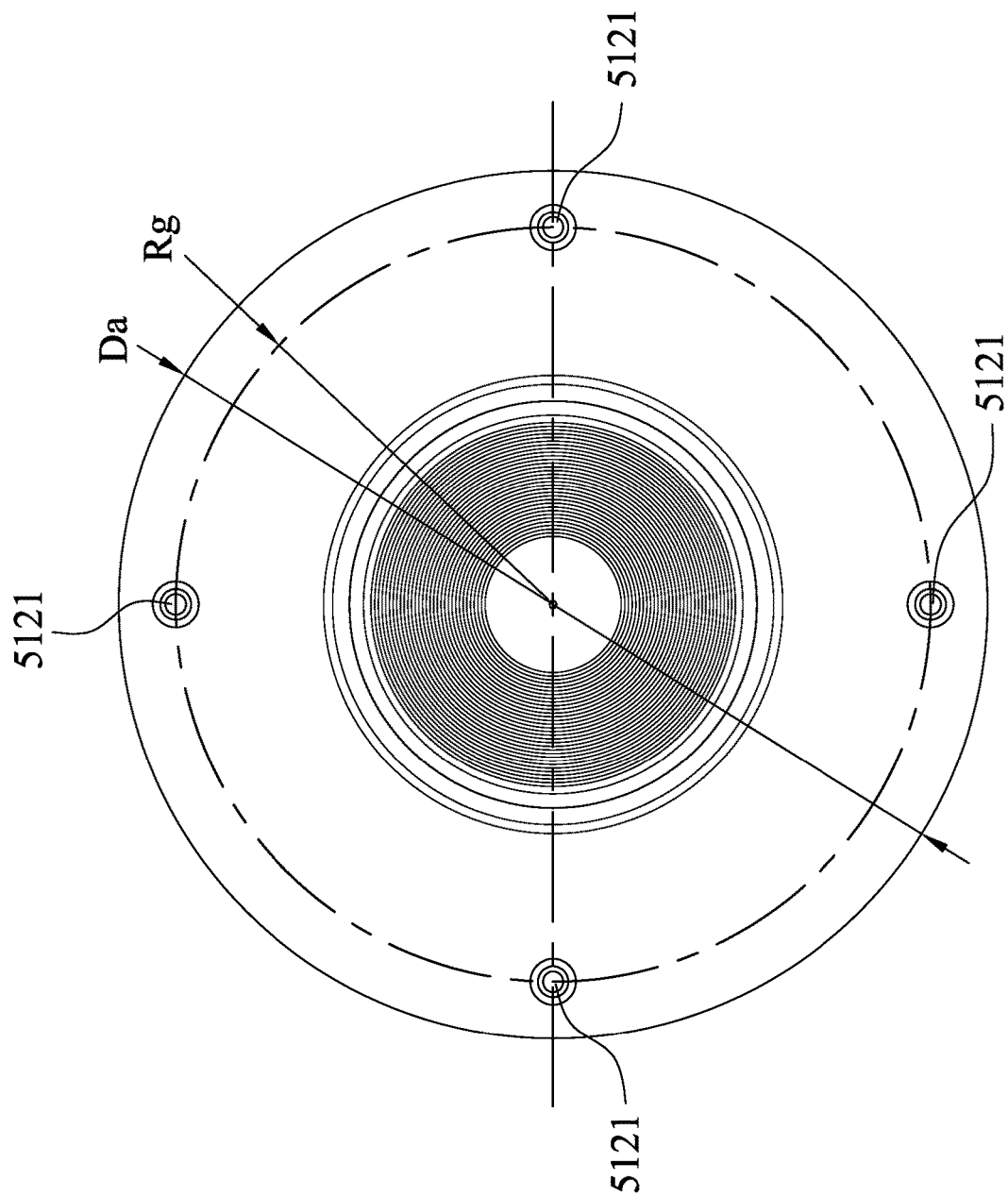
FIG. 5G is another schematic view of the parameters according to the 5th example of FIG. 5A.

FIGS. 5F and 5G which are schematic views of the parameters according to the 5th example of FIG. 5A, respectively. In FIGS. 5F and 5G, when a farthest vertical distance between the gate portion 5121 and the central axis X is Rg (in the 5th example, the farthest vertical distances between three of the gate portions 5121 and the central axis X are all the same), an outer diameter of the light absorbing portion 512 is Da, a minimum opening diameter of the light absorbing portion 512 surrounding the optical effective region 511a is Damin, an outer diameter of the dual molded lens element 510 is DL (in the 5th example, DL=Da), a maximum thickness of the light absorbing portion 512 is ETamax, a thickness of the dual molded lens element 510 close to the central axis X is CT, and a gap between a region projected by the light absorbing portion 512 onto the central axis X and a central thickness region of the dual molded lens element 510 is dT, the following conditions of Table 5 are satisfied, respectively.

TABLE 5 the 5th example

| Rg | 1.825 mm | ETamax | 0.44 mm |
|---|---|---|---|
| Da | 4.2 mm | CT | 0.25 mm |
| 2Rg/Da | 0.87 | ETamax/CT | 1.76 |
| Damin | 1.97 mm | dT | 0.27 mm |
| DL | 4.2 mm | dT/CT | 1.08 |
| Damin/DL | 0.43 | | |

Moreover, in the 5th example, an area of the dual molded lens element 510 is AL, an area of the light absorbing portion 512 is Aa, and Aa/AL=0.78002.

6th Example

Figure 6A:
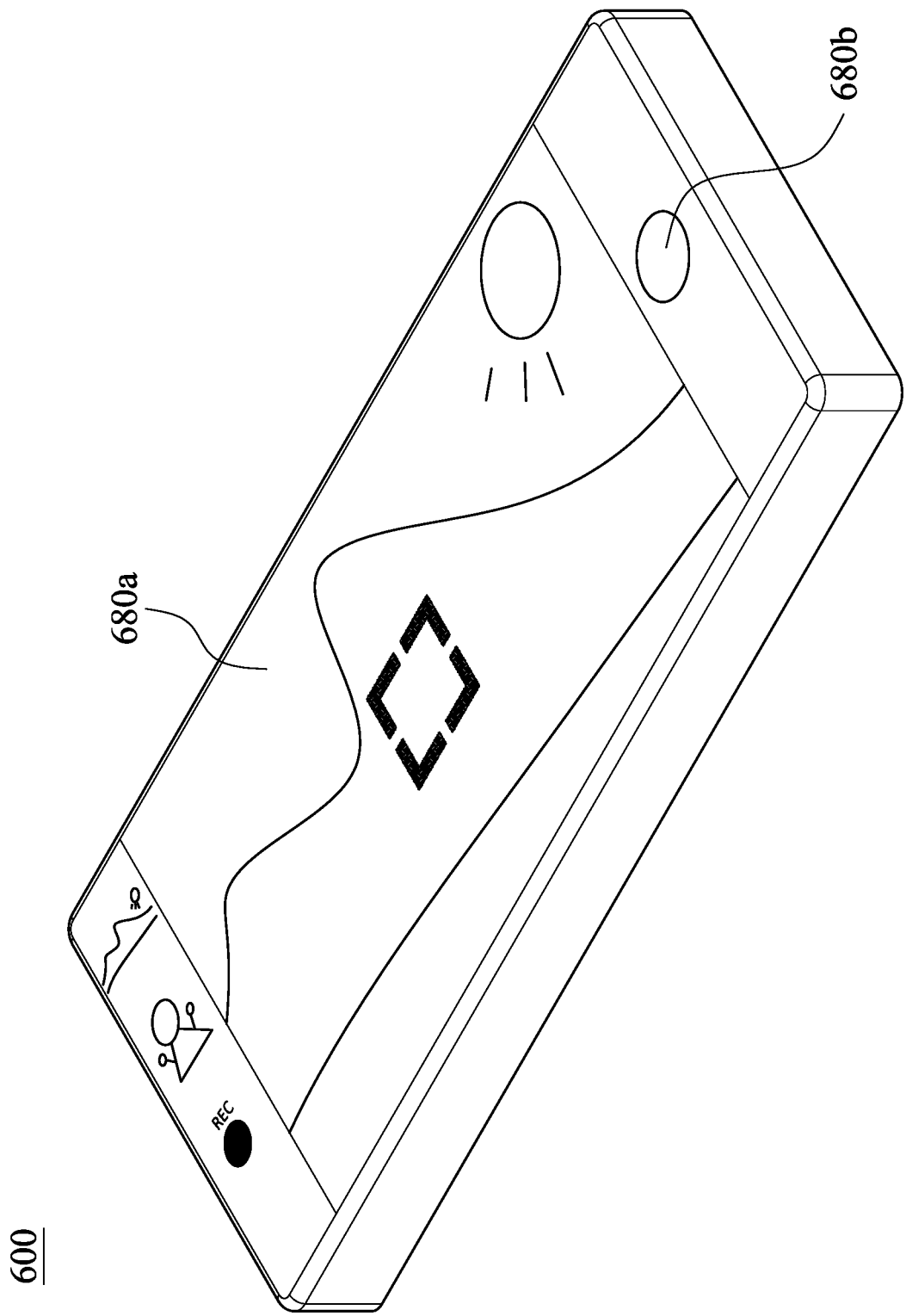
FIG. 6A is an external schematic view of an electronic device according to the 6th example of the present disclosure.
Figure 6B:
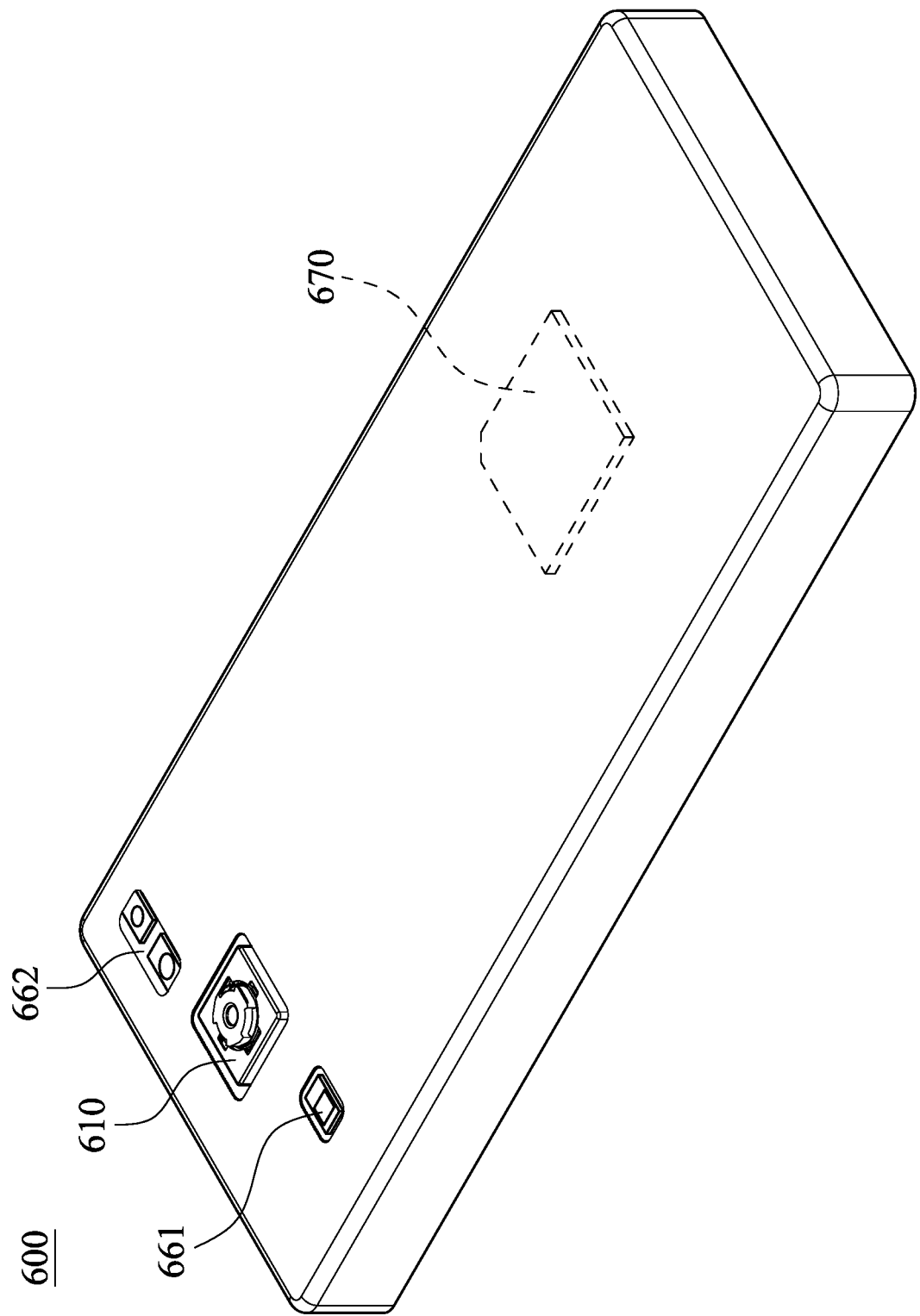
FIG. 6B is another external schematic view of the electronic device according to the 6th example of FIG. 6A.
Figure 6C:
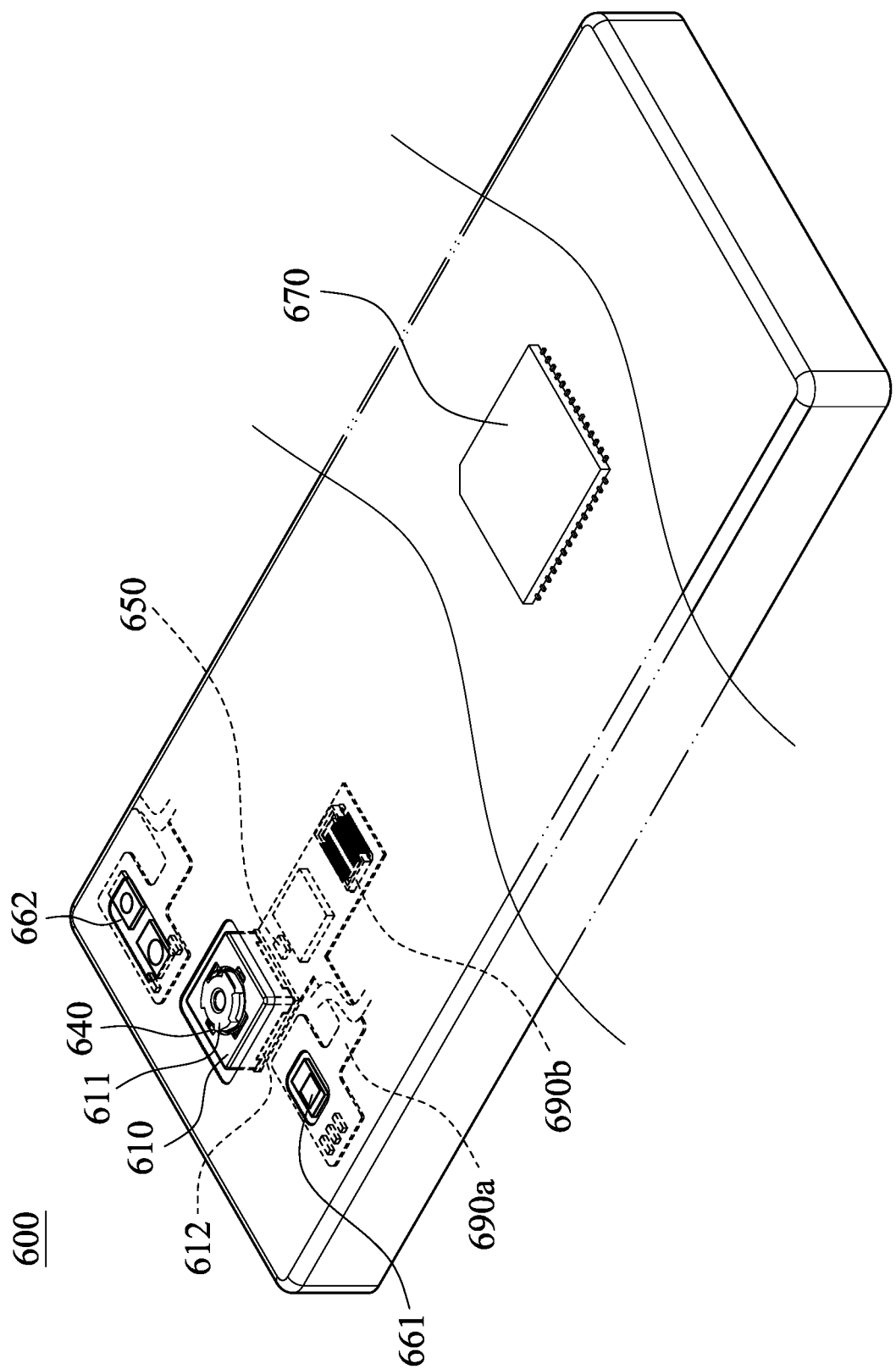
FIG. 6C is an element schematic view of the electronic device according to the 6th example of FIG. 6A.
Figure 6D:
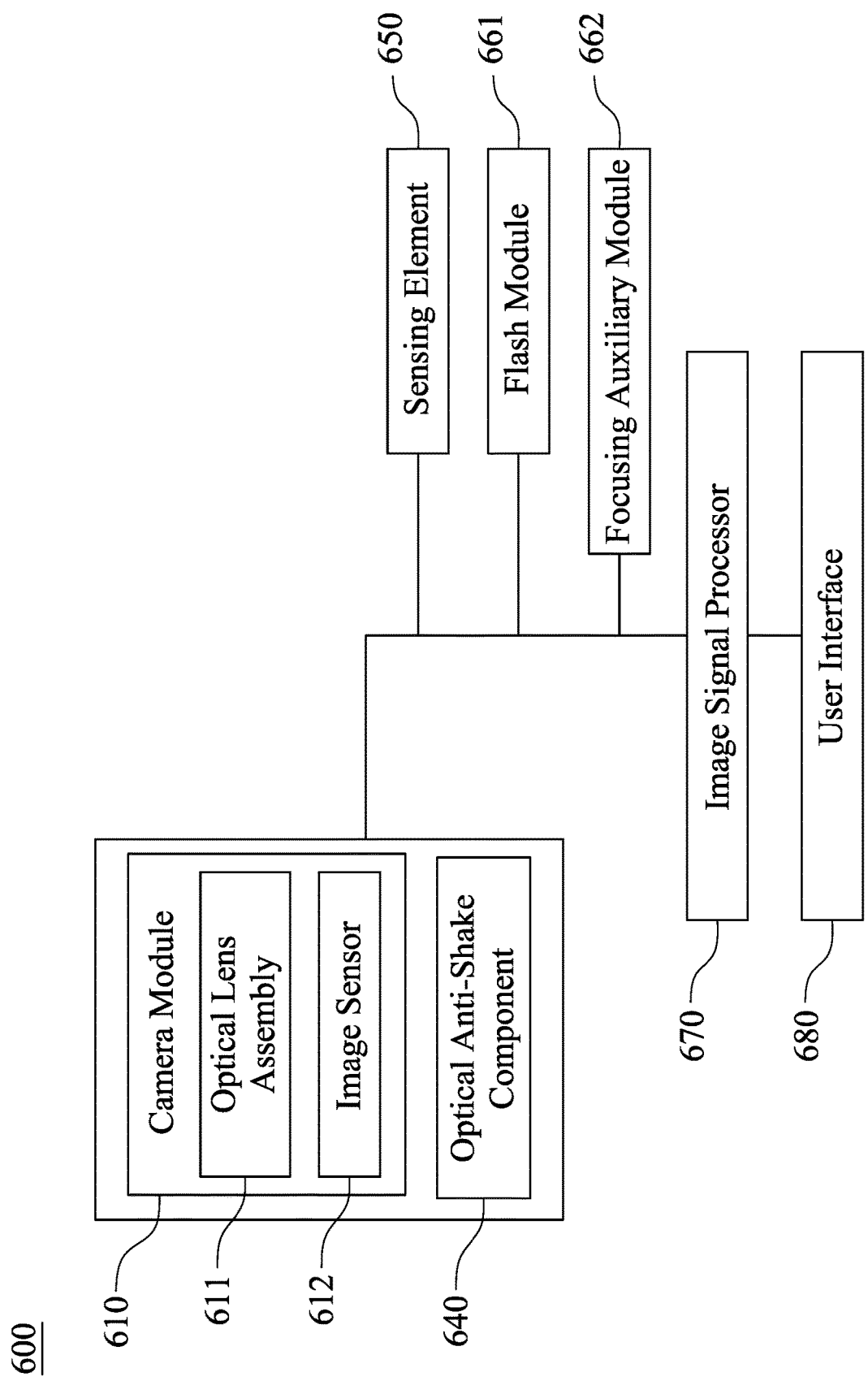
FIG. 6D is a block diagram of the electronic device according to the 6th example of FIG. 6A.

FIG. 6A is an external schematic view of an electronic device 600 according to the 6th example of the present disclosure, FIG. 6B is another external schematic view of the electronic device 600 according to the 6th example of FIG. 6A, FIG. 6C is an element schematic view of the electronic device 600 according to the 6th example of FIG. 6A, and FIG. 6D is a block diagram of the electronic device 600 according to the 6th example of FIG. 6A. In FIGS. 6A, 6B, 6C and 6D, the electronic device 600 of the 6th example is a smart phone, and the electronic device 600 includes the camera module 610 according to the present disclosure, wherein the camera module 610 includes any one of the optical lens assembly 611 in the foregoing examples and the image sensor 612, and the image sensor 612 is disposed on an image surface of the optical lens assembly 611 (not shown). Therefore, it is favorable for satisfying requirements of the mass production and appearance of the camera module applied to the electronic device nowadays.

Furthermore, the user enters the shooting mode through the user interface 680 of the electronic device 600, wherein the user interface of the 6th example can be a touch screen 680a, a button 680b, etc. At this time, the optical lens assembly 611 collects the imaging light on the image sensor 612, and outputs an electronic signal about the image to an Image Signal Processor (ISP) 670.

In response to the camera specifications of the electronic device 600, the electronic device 600 may further include an optical anti-shake component 640, which can be an OIS anti-shake feedback device. Furthermore, the electronic device 600 can further include at least one auxiliary optical element (its reference numeral is omitted) and at least one sensing element 650. In the 6th example, the auxiliary optical element can be a flash module 661 and a focusing auxiliary module 662. The flash module 661 can compensate for color temperature, and the focusing auxiliary module 662 can be an infrared ranging component, a laser focusing module, etc. The sensing element 650 can have a function of sensing physical momentum and actuation energy, such as an accelerometer, a gyroscope, and a Hall Effect Element to sense the shaking and shaking applied by the user's hand or the external environment. Further, the autofocus function and the optical anti-shake component 640 configured by the camera module 610 in the electronic device 600 are facilitated to obtain good imaging quality, and the electronic device 600 according to the present disclosure has a plurality of modes of shooting functions, such as optimized self-timer, low light source HDR (High Dynamic Range imaging), high resolution 4K (4K Resolution) video. Moreover, the user can directly view the camera's shooting screen from the touch screen and manually operate the viewing range on the touch screen to achieve the autofocus function of what you see is what you get.

Moreover, in FIG. 6C, the camera module 610, the optical anti-shake component 640, the sensing element 650, the flash module 661 and the focusing auxiliary module 662 can be disposed on a Flexible Printed Circuit Board (FPC) 690a and electrically connected to the imaging signal processing component 670 through the connector 690b to execute the photographing process. The current electronic devices, such as smart phones, have a thin and light trend. The camera module and related components are arranged on a flexible circuit board, and then the circuit is integrated into the main board of the electronic device by using a connector, which can meet the limited space of the mechanism design and the circuit layout requirements, and the greater margin is achieved, and the autofocus function of the imaging lens is more flexibly controlled by the touch screen of the electronic device. In other embodiments (not shown), the sensing element and the auxiliary optical element can also be disposed on the main board of the electronic device or other forms of the carrier according to the mechanism design and the circuit layout requirements.

Furthermore, the electronic device 600 can further include, but is not limited to, a display unit, a control unit, a storage unit, a Random Access Memory unit (RAM), a Read-Only Memory unit (ROM), or a combination thereof.

7th Example

Figure 7:
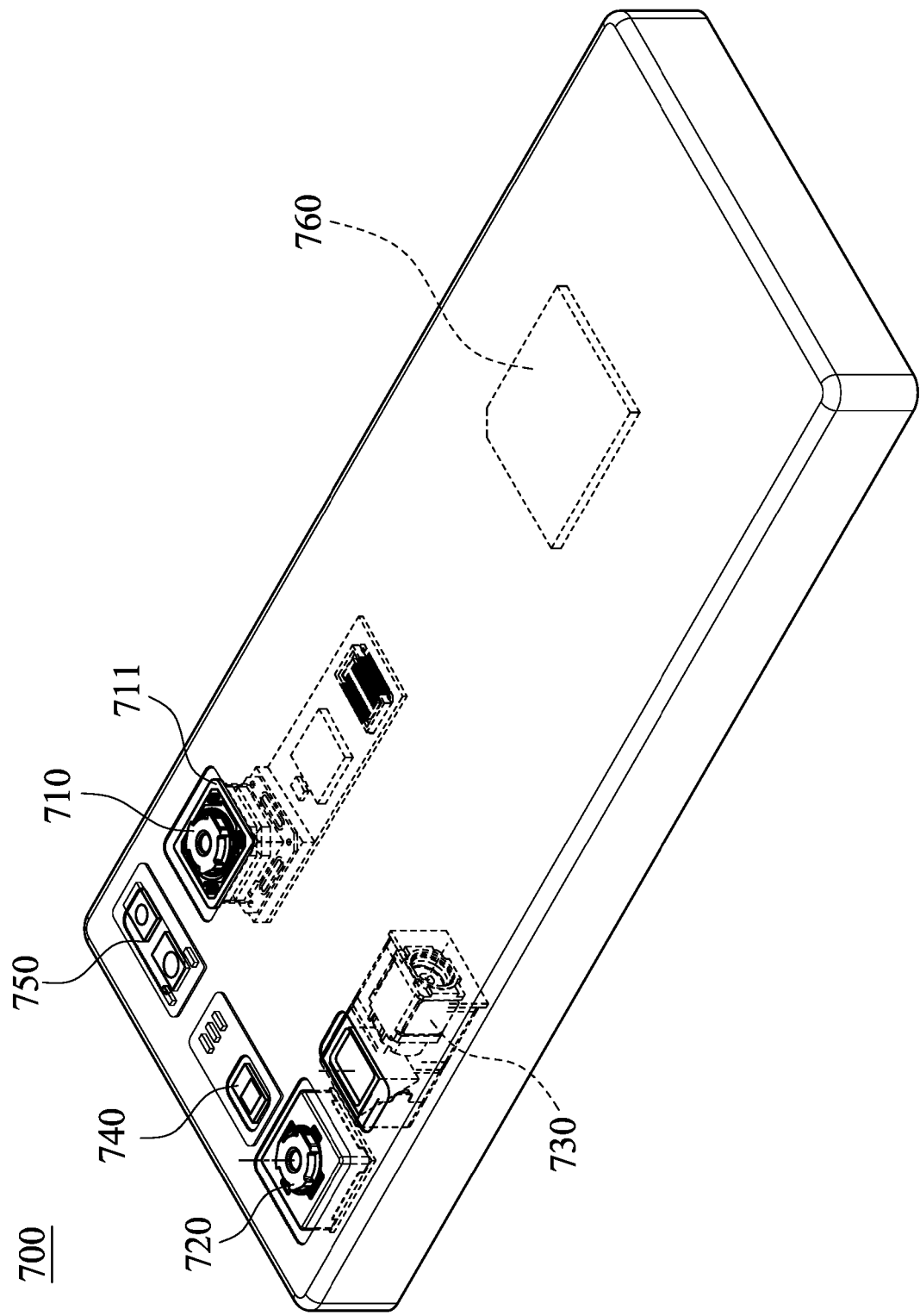
FIG. 7 is a schematic view of an electronic device according to the 7th example of the present disclosure.

FIG. 7 is a schematic view of an electronic device 700 according to the 7th example of the present disclosure. In FIG. 7, the electronic device 700 of the 7th example is a smart phone, and the electronic device 600 includes three camera modules 710, 720, 730, a flash module 740, a focusing auxiliary module 750, an image signal processor 760, a user interface (not shown) and an image software processor (not shown), wherein the camera modules 710, 720, 730 face toward a same side (and face toward an object-side). When the user shoots the subject through the user interface, the electronic device 700 collects the image by using the camera modules 710, 720, 730. The user switches on the flash module 740 to fill the light, and the subject is quickly focused by using the object distance information which is provided from the focusing auxiliary module 750, plus the image signal processor 760 and the image software processor optimize the image. Furthermore, the image quality produced by the optical lens assembly in the camera modules 710, 720, 730 is further improved. The focusing auxiliary module 750 can use infrared or laser focusing auxiliary system to achieve quick focusing, and the user interface can adopt a touch screen or a physical shooting button to perform image capturing and image processing with various functions of the image processing software.

In the 7th example, the camera modules 710, 720, 730 can include any one of the optical lens assembly in the 1st to the 5th foregoing examples, but it is not limited thereto.

Moreover, in the 7th example, an optical anti-shake component 711 is disposed on the outside of the camera module 710, which can be an OIS anti-shake feedback device. The image capturing device 730 is a telescope head, but the disclosure is not limited thereto.

8th Example

Figure 8:
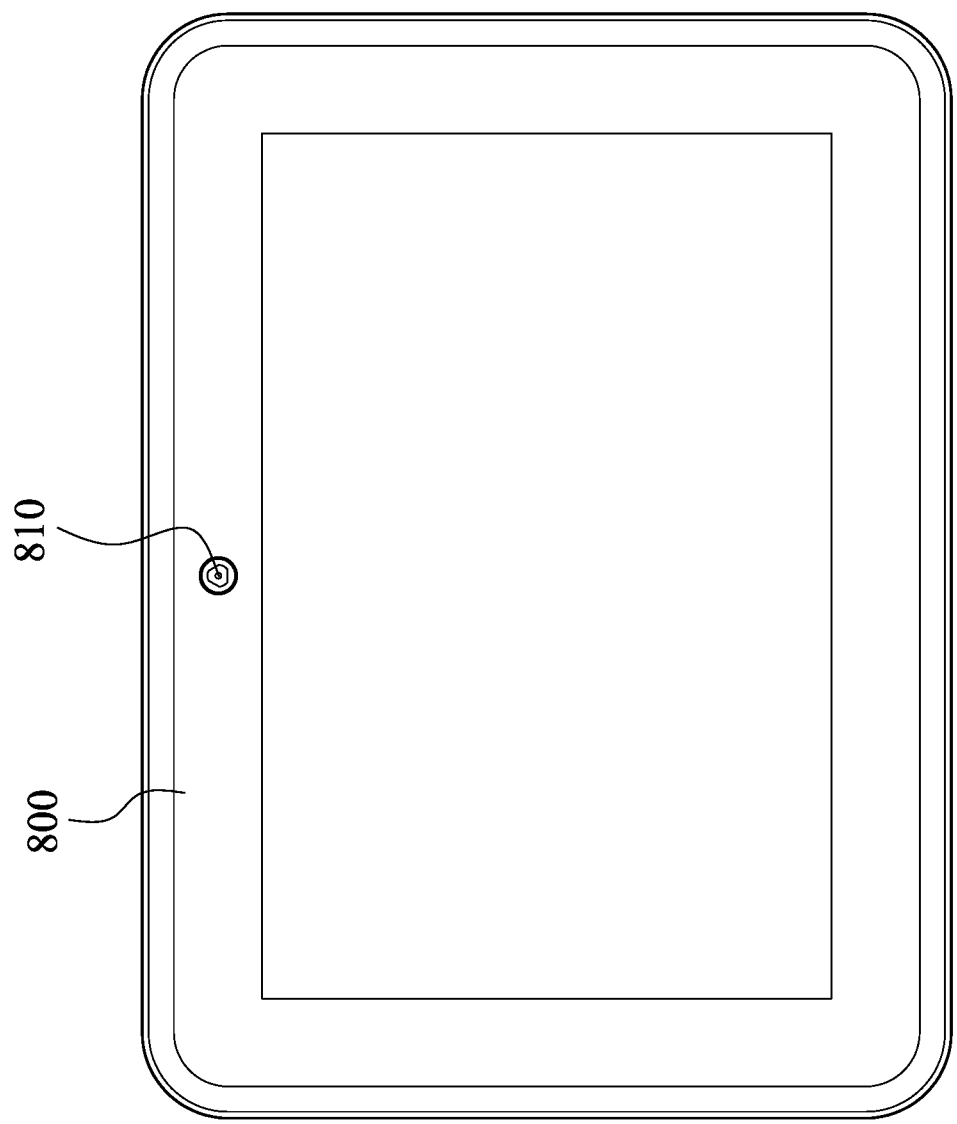
FIG. 8 is a schematic view of an electronic device according to the 8th example of the present disclosure.

FIG. 8 is a schematic view of an electronic device 800 according to the 8th example of the present disclosure. The electronic device 800 of the 8th example is a tablet. The electronic device 800 includes a camera module 810 according to the present disclosure, wherein the camera module 810 includes an optical lens assembly (not shown) and an image sensor (not shown), and the image sensor is disposed on an imaging surface (not shown) of the optical lens assembly.

9th Example

Figure 9:
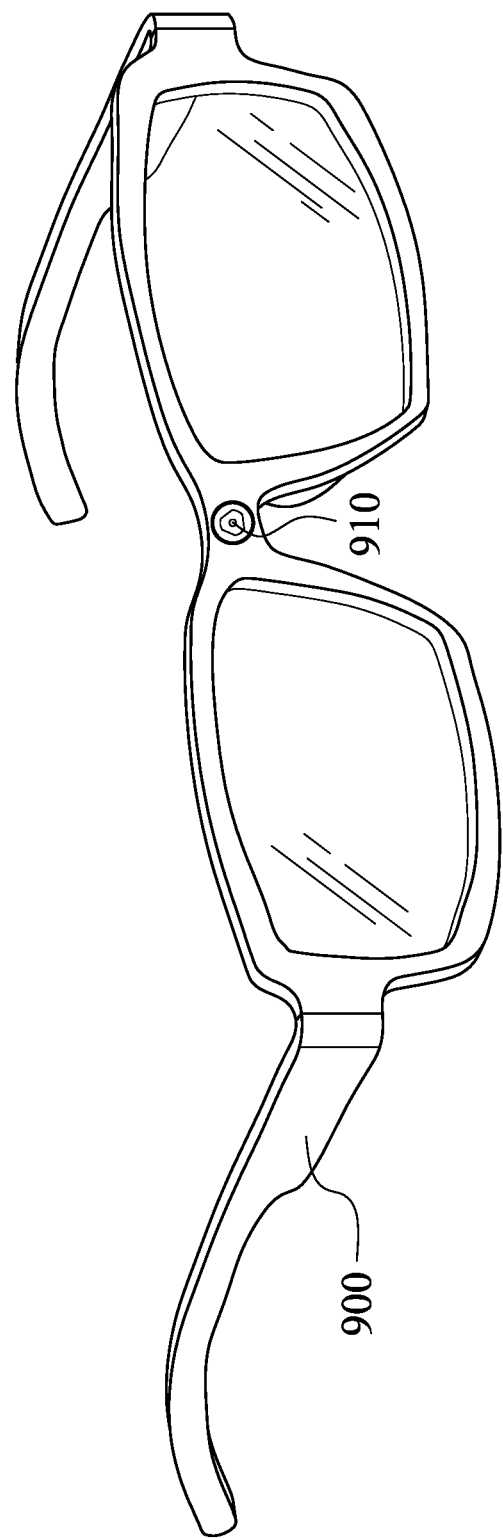
FIG. 9 is a schematic view of an electronic device according to the 9th example of the present disclosure.

FIG. 9 is a schematic view of an electronic device 900 according to the 9th example of the present disclosure. The electronic device 900 of the 9th example is a wearable device. The electronic device 900 includes a camera module 910 according to the present disclosure, wherein the camera module 910 includes an optical lens assembly (not shown) and an image sensor (not shown), and the image sensor is disposed on an imaging surface (not shown) of the optical lens assembly.

The foregoing description, for purpose of explanation, has been described with reference to specific embodiments and examples. The embodiments and examples were chosen and described in order to best explain the principles of the disclosure and its practical applications, to thereby enable others skilled in the art to best utilize the disclosure and various embodiments and examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising at least one dual molded lens element, the dual molded lens element having a central axis and comprising:
   a light transmitting portion, comprising:
   an optical effective region; and
   a lens peripheral region surrounding the optical effective region; and
   a light absorbing portion surrounding the optical effective region, wherein the light transmitting portion and the light absorbing portion are made of different plastic materials with different colors;
   wherein, the light transmitting portion and the light absorbing portion of the dual molded lens element are integrally formed by a dual-shot injection molding;
   wherein a gap between a region projected by the light absorbing portion onto the central axis and a central thickness region of the dual molded lens element is dT, a thickness of the dual molded lens element close to the central axis is CT, and the following condition is satisfied:

$0.2 < dT/CT < 3.0$.

2. The optical lens assembly of claim 1, wherein the light absorbing portion comprises:
   at least three gate portions surrounding the central axis, a farthest vertical distance between the at least three gate portions and the central axis is Rg, an outer diameter of the light absorbing portion is Da, and the following condition is satisfied:

$0.20 < 2Rg/Da \leq 0.97$.

3. The optical lens assembly of claim 2, wherein each of the gate portions comprises a recess structure.

4. The optical lens assembly of claim 3, wherein the dual molded lens element further comprises:
   at least one image-side connecting surface located on an image-side surface of the dual molded lens element for connecting to an optical element adjacent to the dual molded lens element in the optical lens assembly, wherein the image-side connecting surface surrounds the optical effective region, and all of the recess structure are disposed on the image-side connecting surface.

5. The optical lens assembly of claim 2, wherein all of the gate portions are located on a same plane.

6. The optical lens assembly of claim 5, wherein the plane is perpendicular to the central axis.

7. The optical lens assembly of claim 2, wherein the farthest vertical distance between the at least three gate portions and the central axis is Rg, the outer diameter of the light absorbing portion is Da, and the following condition is satisfied:

$0.50 < 2Rg/Da \leq 0.95$.

8. The optical lens assembly of claim 7, wherein a minimum opening diameter of the light absorbing portion surrounding the optical effective region is Damin, an outer diameter of the dual molded lens element is DL, and the following condition is satisfied:

$0.20 < Damin/DL < 0.80$.

9. The optical lens assembly of claim 8, wherein the minimum opening diameter of the light absorbing portion surrounding the optical effective region is Damin, and the outer diameter of the dual molded lens element is DL, and the following condition is satisfied:

$0.30 < Damin/DL < 0.70$.

10. The optical lens assembly of claim 1, wherein a maximum thickness of the light absorbing portion is ETamax, a thickness of the dual molded lens element close to the central axis is CT, and the following condition is satisfied:

$0.3 < ETamax/CT < 2.5$.

11. The optical lens assembly of claim 10, wherein the maximum thickness of the light absorbing portion is ETamax, the thickness of the dual molded lens element close to the central axis is CT, and the following condition is satisfied:

$1.0 < ETamax/CT < 2.5$.

12. The optical lens assembly of claim 1, wherein a region projected by the light absorbing portion onto the central axis does not overlap with a region of the dual molded lens element on the central axis.

13. The optical lens assembly of claim 1, wherein the gap between the region projected by the light absorbing portion onto the central axis and the central thickness region of the dual molded lens element is dT, the thickness of the dual molded lens element close to the central axis is CT, and the following condition is satisfied:

$0.5 < dT/CT < 2.2$.

14. The optical lens assembly of claim 2, wherein an area of the dual molded lens element is AL, an area of the light absorbing portion is Aa, and the following condition is satisfied:

$0.50 < Aa/AL < 0.94$.

15. The optical lens assembly of claim 2, wherein an area of the dual molded lens element is AL, an area of the light absorbing portion is Aa, and the following condition is satisfied:

$0.70 < Aa/AL < 0.94$.

16. The optical lens assembly of claim 1, further comprising a plurality of optical elements;
    wherein the dual molded lens element further comprises an image-side axial connecting structure, the image-side axial connecting structure comprises an axial connecting surface and at least one image-side connecting surface, wherein the at least one image-side connecting surface is away from the optical effective region than the axial connecting surface is therefrom;
    wherein the image-side axial connecting structure is for aligning the dual molded lens element with the optical elements adjacent thereto.

17. The optical lens assembly of claim 16, wherein an angle between the axial connecting surface and the at least one image-side connecting surface is a, and the following condition is satisfied:

$95$ degrees $< \alpha < 135$ degrees.

18. The optical lens assembly of claim 16, wherein the image-side axial connecting structure is disposed at least on the light absorbing portion.

19. The optical lens assembly of claim 16, wherein the image-side axial connecting structure is aligned with at least two of the optical elements adjacent thereto.

20. An electronic device, comprising:
    a camera module comprising the optical lens assembly of claim 1 and an image sensor, and the image sensor is disposed on an image surface of the optical lens assembly.

21. An electronic device, comprising:
at least two camera modules facing toward a same side, wherein at least one of the at least two camera modules comprises the optical lens assembly of claim 1 and an image sensor, and the image sensor is disposed on an image surface of the optical lens assembly.

\* \* \* \* \*